(12) United States Patent
Emori

(10) Patent No.: US 10,148,708 B2
(45) Date of Patent: Dec. 4, 2018

(54) ELECTRONIC INFORMATION TERMINAL, IMAGE PROCESSING APPARATUS, AND INFORMATION PROCESSING METHOD

(71) Applicant: Mototsugu Emori, Saitama (JP)

(72) Inventor: Mototsugu Emori, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 212 days.

(21) Appl. No.: 14/935,970

(22) Filed: Nov. 9, 2015

(65) Prior Publication Data

US 2016/0149976 A1 May 26, 2016

(30) Foreign Application Priority Data

Nov. 26, 2014 (JP) ................................ 2014-239023
Feb. 9, 2015 (JP) ................................ 2015-023671

(51) Int. Cl.
| | | |
|---|---|---|
| H04L 29/06 | (2006.01) | |
| G06F 3/03 | (2006.01) | |
| G06T 11/20 | (2006.01) | |
| G06F 3/0488 | (2013.01) | |

(52) U.S. Cl.
CPC ...... H04L 65/4015 (2013.01); G06F 3/04883 (2013.01); H04L 65/1083 (2013.01); H04L 65/80 (2013.01)

(58) Field of Classification Search
CPC . H04L 65/80; H04L 65/4015; H04L 65/1083; H04L 67/2842; H04L 67/32; H04L 67/04; H04L 41/0816; G06F 3/0488; G06F 3/04883
USPC ....................................................... 709/205
See application file for complete search history.

(56) References Cited

U.S. PATENT DOCUMENTS

| | | | | |
|---|---|---|---|---|
| 2008/0176555 A1* | 7/2008 | Okuyama | ......... | H04L 29/06027 455/424 |
| 2010/0082711 A1* | 4/2010 | Herman | ............ | G06F 17/30067 707/816 |
| 2013/0063537 A1* | 3/2013 | Emori | .................... | H04N 7/147 348/14.01 |
| 2013/0321562 A1* | 12/2013 | Takahashi | ........... | H04L 65/1083 348/14.06 |
| 2015/0029196 A1* | 1/2015 | Shida | .................... | G06T 11/203 345/443 |
| 2015/0035938 A1 | 2/2015 | Emori | | |
| 2015/0091940 A1 | 4/2015 | Emori et al. | | |

FOREIGN PATENT DOCUMENTS

| | | |
|---|---|---|
| JP | 2011-524572 | 9/2011 |
| JP | 2014-150497 | 8/2014 |
| JP | 2015-056844 | 3/2015 |
| WO | WO2009/151940 A2 | 12/2009 |

* cited by examiner

*Primary Examiner* — Ruolei Zong
(74) *Attorney, Agent, or Firm* — Oblon, McClelland, Maier & Neustadt, L.L.P.

(57) ABSTRACT

An electronic information terminal includes a transmission storage unit that stores stroke data to be transferred temporarily, a network status management unit that detects and manages a status of a communication network to which the electronic information terminal is connected, and a transmitter that transfers the stroke data read from the transmission storage unit to an image processing apparatus via the communication network in accordance with the status of the communication network detected by the network status management unit.

11 Claims, 19 Drawing Sheets

| EVENT NAME | OPERATED PAGE | EVENT GENERATION DATE/TIME | EVENT TRANSMISSION DATE/TIME | COORDI-NATES |
|---|---|---|---|---|
| Mouse_Down | 1 | 2014/09/22 16:50:31:100 | 2014/09/22 16:50:31:100 | (100, 100) |
| Mouse_Move | 1 | 2014/09/22 16:50:31:150 | 2014/09/22 16:50:31:150 | (110, 120) |
| Mouse_Move | 1 | 2014/09/22 16:50:31:200 | 2014/09/22 17:00:11:100 | (120, 150) |
| Mouse_Up | 1 | 2014/09/22 16:50:31:250 | 2014/09/22 17:00:11:150 | (120, 150) |

| LFB STROKE ID | EVENT NAME | OPERATED PAGE | EVENT GENERATION DATE/TIME | EVENT TRANSMISSION DATE/TIME | COORDI-NATES |
|---|---|---|---|---|---|
| 001 | Mouse_Down | 1 | 2014/09/22 16:50:31:100 | 2014/09/22 16:50:31:100 | (100, 100) |
| 001 | Mouse_Move | 1 | 2014/09/22 16:50:31:150 | 2014/09/22 16:50:31:150 | (110, 120) |
| 001 | Mouse_Move | 1 | 2014/09/22 16:50:31:200 | 2014/09/22 16:50:31:200 | (120, 150) |
| 001 | Mouse_Up | 1 | 2014/09/22 16:50:31:250 | 2014/09/22 16:50:31:250 | (120, 150) |
| 002 | Mouse_Down | 1 | 2014/09/22 16:51:31:100 | 2014/09/22 16:51:31:100 | (200, 100) |
| 002 | Mouse_Move | 1 | 2014/09/22 16:51:31:150 | 2014/09/22 16:51:31:150 | (210, 120) |
| 002 | Mouse_Move | 1 | 2014/09/22 16:51:31:200 | 2014/09/22 16:51:31:200 | (220, 150) |
| 002 | Mouse_Up | 1 | 2014/09/22 16:51:31:250 | 2014/09/22 16:51:31:250 | (220, 150) |

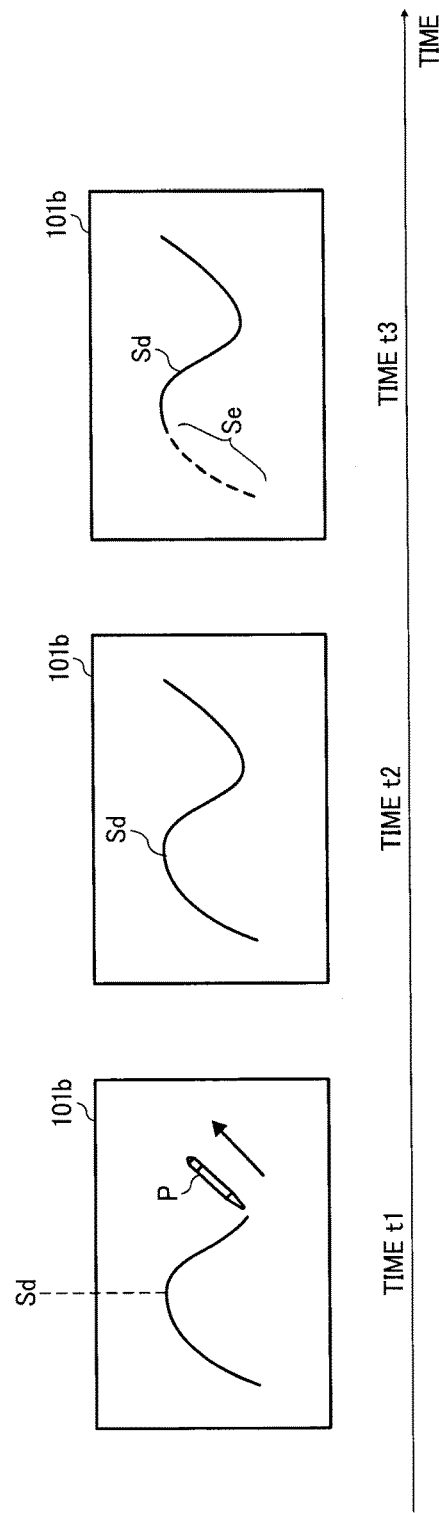

ELECTRONIC INFORMATION TERMINAL, IMAGE PROCESSING APPARATUS, AND INFORMATION PROCESSING METHOD

CROSS-REFERENCE TO RELATED APPLICATIONS

This patent application is based on and claims priority pursuant to 35 U.S.C. § 119(a) to Japanese Patent Application Nos. 2014-239023, filed on Nov. 26, 2014 and 2015-023671, filed on Feb. 9, 2015 in the Japan Patent Office, the entire disclosures of which are hereby incorporated by reference herein.

BACKGROUND

Technical Field

The present invention relates to an electronic information terminal, an image processing apparatus, and an information processing method.

Background Art

At present, remote electronic information terminals such as electronic whiteboards and interactive whiteboards connected via a communication network and used for electronic conferences and presentations have become widely used.

A multimedia conference system technology that distributes digital data of pen strokes drawn on an electronic information terminal such as a whiteboard to another remote whiteboard via a multimedia conference server is known. In the technology, the remote whiteboard draws the pen strokes based on the digital data received from the whiteboard. As a result, it is possible to share the content written on the whiteboard among remote users.

SUMMARY

Embodiments of the present invention provide a novel electronic information terminal that includes a transmission storage unit that stores stroke data to be transferred temporarily, a network status management unit that detects and manages a status of a communication network to which the electronic information terminal is connected, and a transmitter that transfers the stroke data read from the transmission storage unit to an image processing apparatus via the communication network in accordance with the status of the communication network detected by the network status management unit.

Further embodiments of the present invention provide an image processing apparatus and an information processing method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 24 is a schematic diagram illustrating a process of erasing the LFB stroke partially in stages.

DETAILED DESCRIPTION

Figure 1:
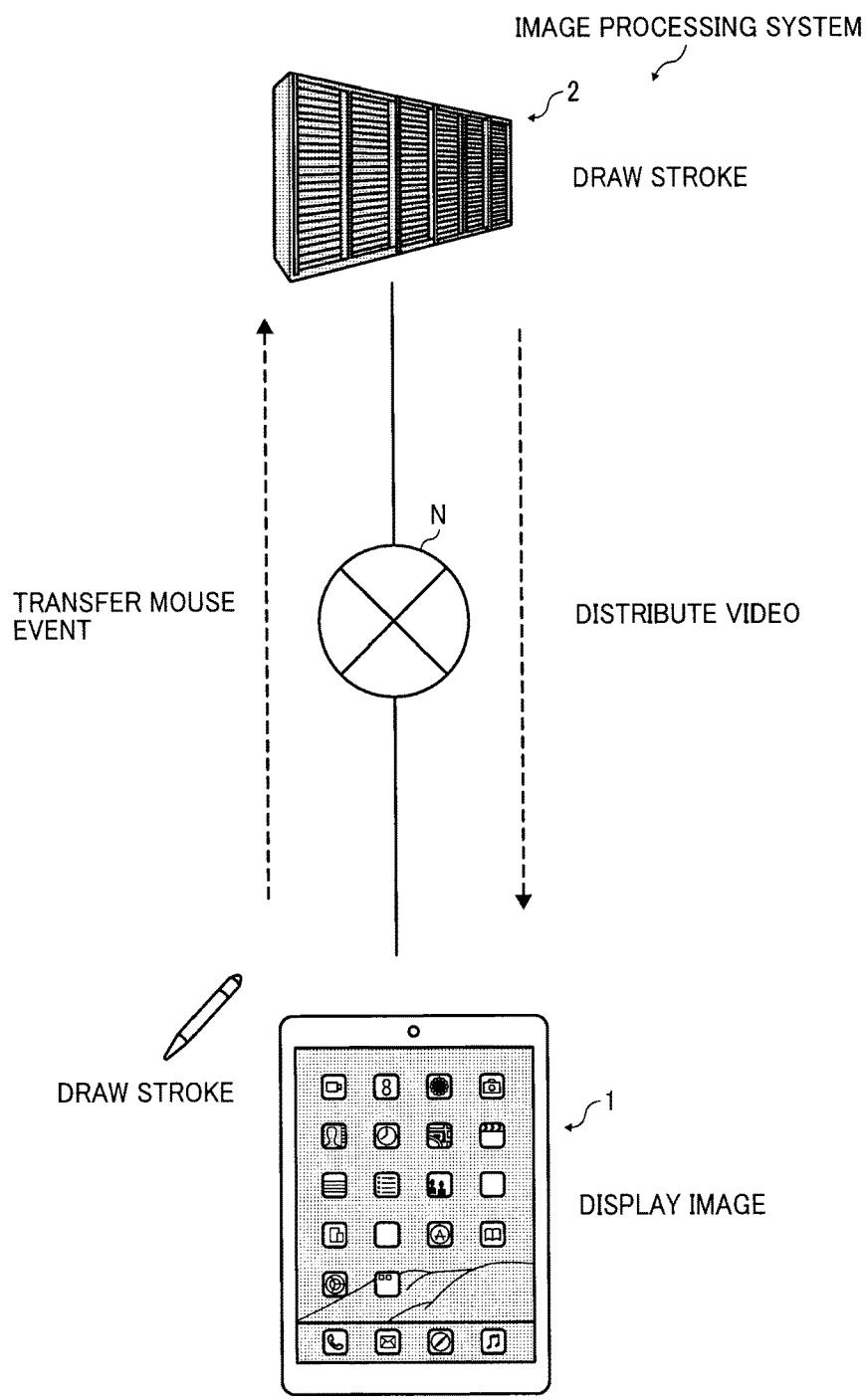
FIG. 1 is a diagram illustrating an overall configuration of an image processing system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the known technology described above, if the whiteboard transferring the pen stroke data is disconnected from the communication network, it is possible that a part of the pen stroke data received by the other whiteboard is lost.

In the embodiments described below, an electronic information terminal, an image processing apparatus, and an image processing system that can resolve the above issue are provided.

In the image processing system of the embodiments, the electronic information terminal is connected to the server via the communication network. The electronic information terminal transfers the generated stroke data to the server, and the server generates video on which the stroke is drawn based on the received stroke data and distributes it to the electronic information terminal. The electronic information terminal displays the video distributed by the server on the display. In addition, the electronic information terminal implements a LFB function, generates a stroke based on the stroke data generated by the electronic information terminal, superimposes the generated stroke on the video distributed by the server, and displays the superimposed video on the display.

In the image processing system of the embodiments, a network status management unit always monitors a status of the communication network. The electronic information terminal of the embodiments controls transferring the stroke data in accordance with the status of the communication network (i.e., disconnected/connected, deteriorated quality/improved quality) and turns on and off the LFB function. The server of the embodiments modifies a process of the stroke data received from the electronic information terminal in accordance with the status of the communication network.

The characteristics of the embodiments are described below in detail with reference to figures.

[An Overall Configuration of the Image Processing System]

FIG. 1 is a diagram illustrating an overall configuration of an image processing system in this embodiment. The image processing system in this embodiment includes an electronic information terminal 1 such as Apple iPad and an interactive whiteboard, a server 2 that functions as an image processing apparatus, and a communication network N that connects the electronic information terminal 1 to the server 2.

The electronic information terminal 1 includes a touch panel display, and a mouse event (stroke data) is generated if a handwritten image (stroke) is drawn on the electronic information terminal 1. The electronic information terminal 1 transfers the mouse event to the server 2. A stroke drawing application in the server 2 generates images on which the stroke received from the electronic information terminal 1 is drawn. The server 2 generates a video from the images generated by the stroke drawing application and distributes the video encoded in a predetermined format to the electronic information terminal 1. The electronic information terminal 1 displays the video received from the server 2 on the touch panel display.

[A Hardware Configuration of the Electronic Information Terminal]

Figure 2:
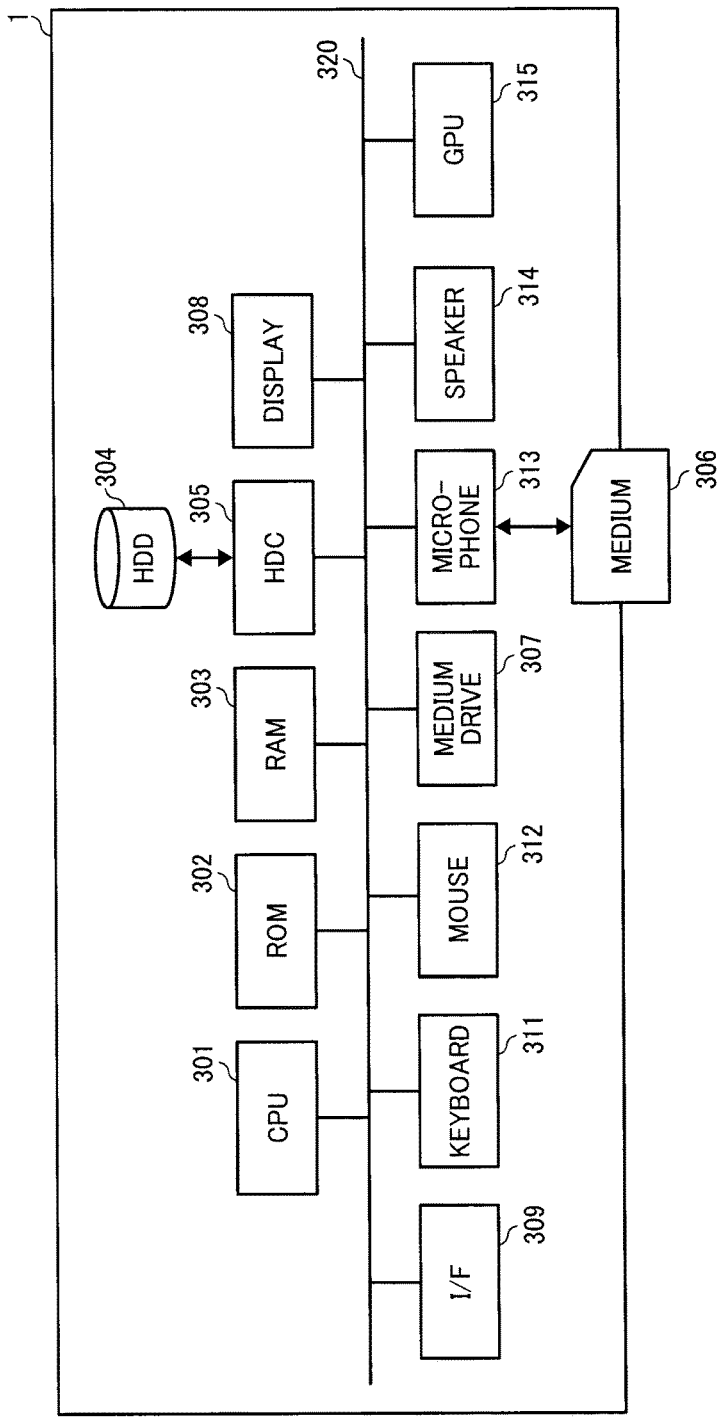
FIG. 2 is a diagram illustrating a hardware configuration of an electronic information terminal as an embodiment of the present invention.

FIG. 2 is a diagram illustrating a hardware configuration of the electronic information terminal in this embodiment. The hardware configuration of the server is the same as the hardware configuration of the electronic information terminal, and its description is omitted.

The electronic information terminal 1 includes a CPU that controls the whole terminal, a ROM 302 that stores programs such as IPL used for driving the CPU 301, and a RAM 303 used as a work area of the CPU 301.

In addition, the electronic information terminal 1 includes a HDD 304 that stores various data such as programs and a hard disk controller (HDC) 305 that controls reading/writing various data from/to the HDD 304 under the control of the CPU 301.

Furthermore, the electronic information terminal 1 includes a medium drive 307 that controls reading/writing data from/to a recording medium 306 such as a flash memory. The display 308 is a touch panel display, and the display 308 also functions as an operation unit to operate the electronic information terminal 1.

In addition, the electronic information terminal 1 includes an interface (I/F) 309 that transfers data via the communication network N. It is also possible that the electronic information terminal 1 includes a keyboard 311 and a mouse 312 for operating the electronic information terminal 1.

The electronic information terminal 1 also includes a microphone 313, a speaker 314, a GPU 315, and a bus line 320 that connects the components described above electrically such as an address bus and a data bus etc.

It is possible that programs for the electronic information terminal and the server are stored as installable or executable files in a computer-readable recording medium such as the recording medium 306 described above for the distribution.

[A Functional Configuration of the Electronic Information Terminal and the Server]

Figure 3:
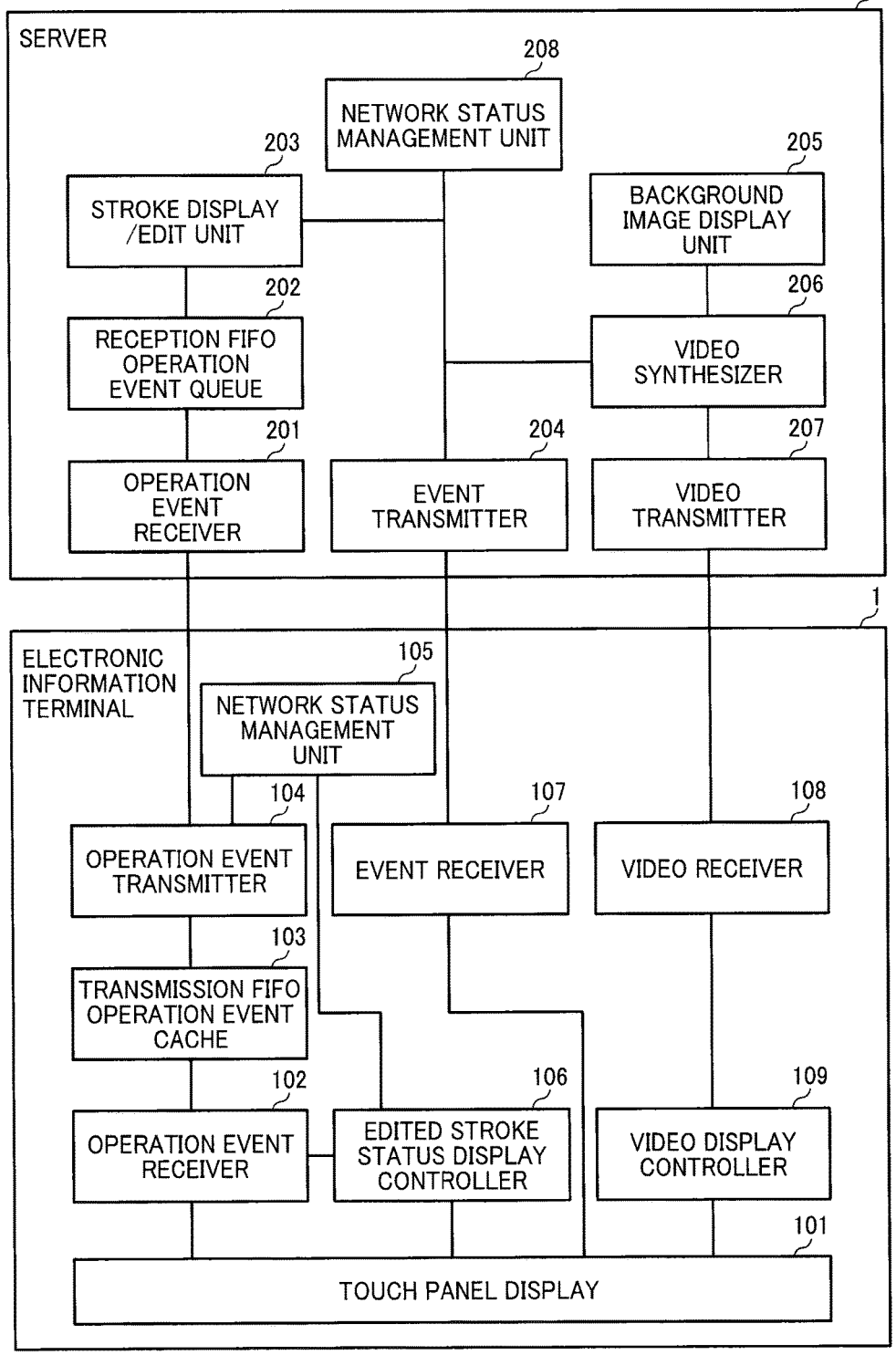
FIG. 3 is a diagram illustrating functional blocks of the electronic information terminal and a server as an embodiment of the present invention.

FIG. 3 is a diagram illustrating functional blocks of the electronic information terminal and a server in this embodiment.

The electronic information terminal 1 includes a touch panel display 101. The touch panel display 101 corresponds to the display 308 in FIG. 2 and functions as a display unit and an operation unit. To operate the electronic information terminal 1, it is possible not only to touch the touch panel display 101 but also to operate the electronic information terminal 1 using devices such as the touch pen and mouse etc.

The electronic information terminal 1 includes an operation event receiver 102 that receives operation events generated by operating the touch panel display 101, an operation event cache 103 (a transmission storing unit) that stores the operation events temporarily before sending them to the server 2, an operation event transmitter 104 (a transmitter) that transfers the operation events read from the operation event cache 103 to the server 2, and a network status management unit 105 that manages the status of the communication network N.

The network status management unit 105 connects to the communication network N, disconnects from the communication network N, and performs various information processes regarding network connections from the server 2. In addition, the network status management unit 105 monitors the status of the communication network (i.e., disconnected/connected, deteriorated quality/improved quality).

The electronic information terminal 1 includes an edited stroke status display controller 106 (an operated status display controller) that displays interfaces for editing strokes and the status of the stroke being edited on the touch panel display 101 based on the operation events received from the touch panel display 101. The edited stroke status display controller 106 is referred to as a LFB and functions as an operated status display controller).

Furthermore, the electronic information terminal 1 includes an event receiver 107 that receives events transferred by a stroke display/edit unit 203 in the server 2 via an event transmitter 204, a video receiver 108 that receives videos from the server 2, and a video display controller 109 that displays the received video on the touch panel display 101. The video receiver 108 functions as a video receiving unit, and the video display controller 109 functions as a video display control unit.

The server 2 includes an operation event receiver 201 that functions as an event receiver that receives the operation events and a FIFO operation event queue 202 (a reception storing unit) that stores the operation events temporarily. The server 2 also includes a stroke display/edit unit 203 (an image data generator) that reads the operation events from the operation event queue 202 and displays/edits strokes.

In addition, the server 2 includes an event transmitter 204 that transfers events occurred while the stroke is edited to the electronic information terminal 1, and a background image display unit 205 that displays a background image. Furthermore, the server 2 includes a video synthesizer 206 that generates videos synthesizing the background image with the strokes and encodes the video in a predetermined format and a video transmitter 207 that distributes the generated video to the electronic information terminal 1. The video synthesizer 206 functions as a video generator, and the video transmitter 207 functions as a video transmission unit. The server 2 also includes a network status management unit 208 that manages the status of the communication network N.

The network status management unit 208 connects to the communication network N, disconnects from the communication network N, and performs various information processes regarding network connections from the electronic information terminal 1. In addition, the network status management unit 208 monitors the status of the communication network (i.e., disconnected/connected, deteriorated quality/improved quality).

[A Basic Operation of the Electronic Information Terminal and the Server]

Figure 4:
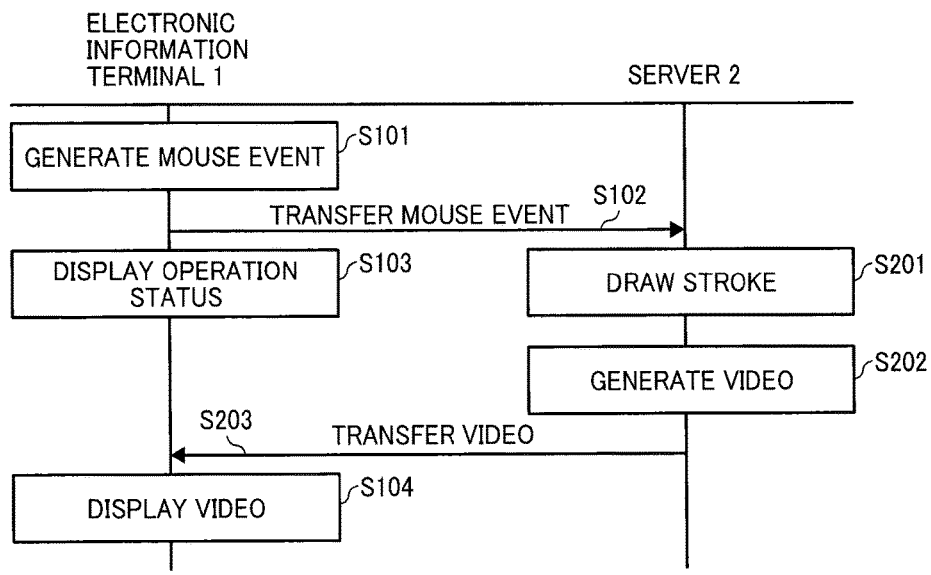
FIG. 4 is a sequence diagram illustrating a basic operation of the electronic information terminal and the server as an embodiment of the present invention.

FIG. 4 is a sequence diagram illustrating a basic operation of the electronic information terminal and the server in this embodiment. In the below description, the basic operation is described based on the mouse event as an example of the operation events.

First, after drawing a stroke by touching the touch panel display 101 on the electronic information terminal 1 etc., the mouse event occurs as the operation event in S101. The operation event receiver 102 receives the mouse event from the touch panel display 101. The mouse event is stored in the operation event cache 103.

The operation event transmitter 104 reads the mouse event from the operation event cache 103 and transfers the mouse event to the server 2 in S102.

After receiving the mouse event from the operation event receiver 102, the edited stroke statue display controller 106 generates a stroke (a LFB stroke, a first image) based on the mouse event and displays it on the touch panel display 101 in S103.

In the server 2, the operation event receiver 201 receives the mouse event. The stroke drawing application in the stroke display/edit unit 203 generates images on which the strokes are drawn sequentially based on the mouse event in S201.

The video synthesizer 206 generates a video from the background image provided by the background image display unit 205 and multiple images generated by the stroke drawing application, and encodes the video in the predetermined format in S202.

The video transmitter 207 distributes the generated video to the electronic information terminal 1 in S203.

In the electronic information terminal 1, the video receiver 108 receives the video. The video display controller 109 decodes the video and displays it on the touch panel display 101 in S104.

In the above description, "the video" indicates generic videos that display images serially, especially the videos encoded in specific formats such as H.264 etc. In this embodiment, the video is distributed from the server 2 to the electronic information terminal 1.

[A Layer Configuration of the Electronic Information Terminal]

Figure 5:
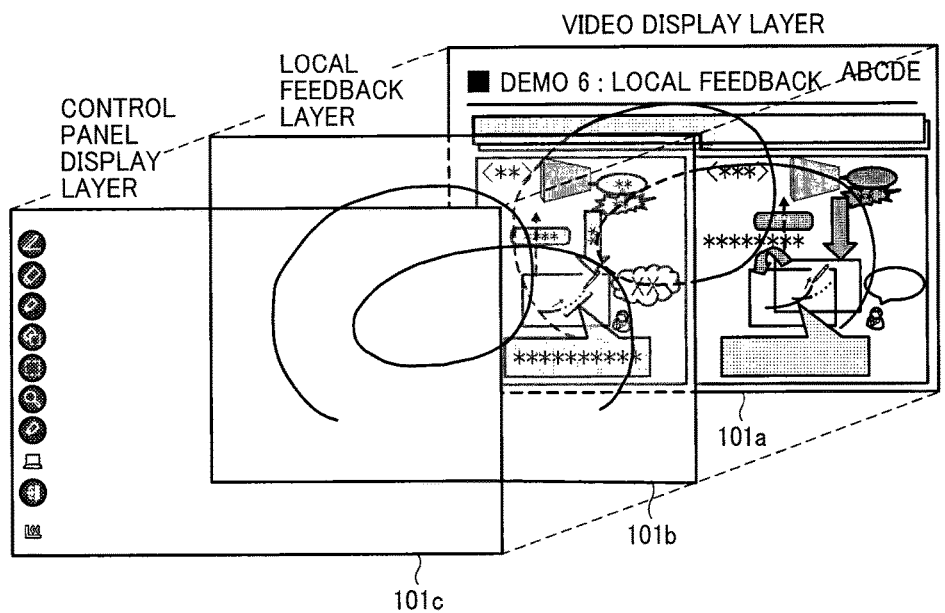
FIG. 5 is a diagram illustrating a layer configuration of a screen displayed on the electronic information terminal as an embodiment of the present invention.

FIG. 5 is a diagram illustrating a layer configuration of a screen displayed on the electronic information terminal in this embodiment. The screen displayed on the electronic information terminal 1 includes a video display layer 101a that displays the video distributed by the server, a local feedback layer 101b that displays interfaces for editing strokes and the status of edited strokes etc., and a control panel display layer 101c that displays a list of usable commands. The touch panel display 101 on the electronic information terminal 1 displays a screen on which these layers are superimposed.

[A Schematic Description of Distributing a Video]

Figure 6:
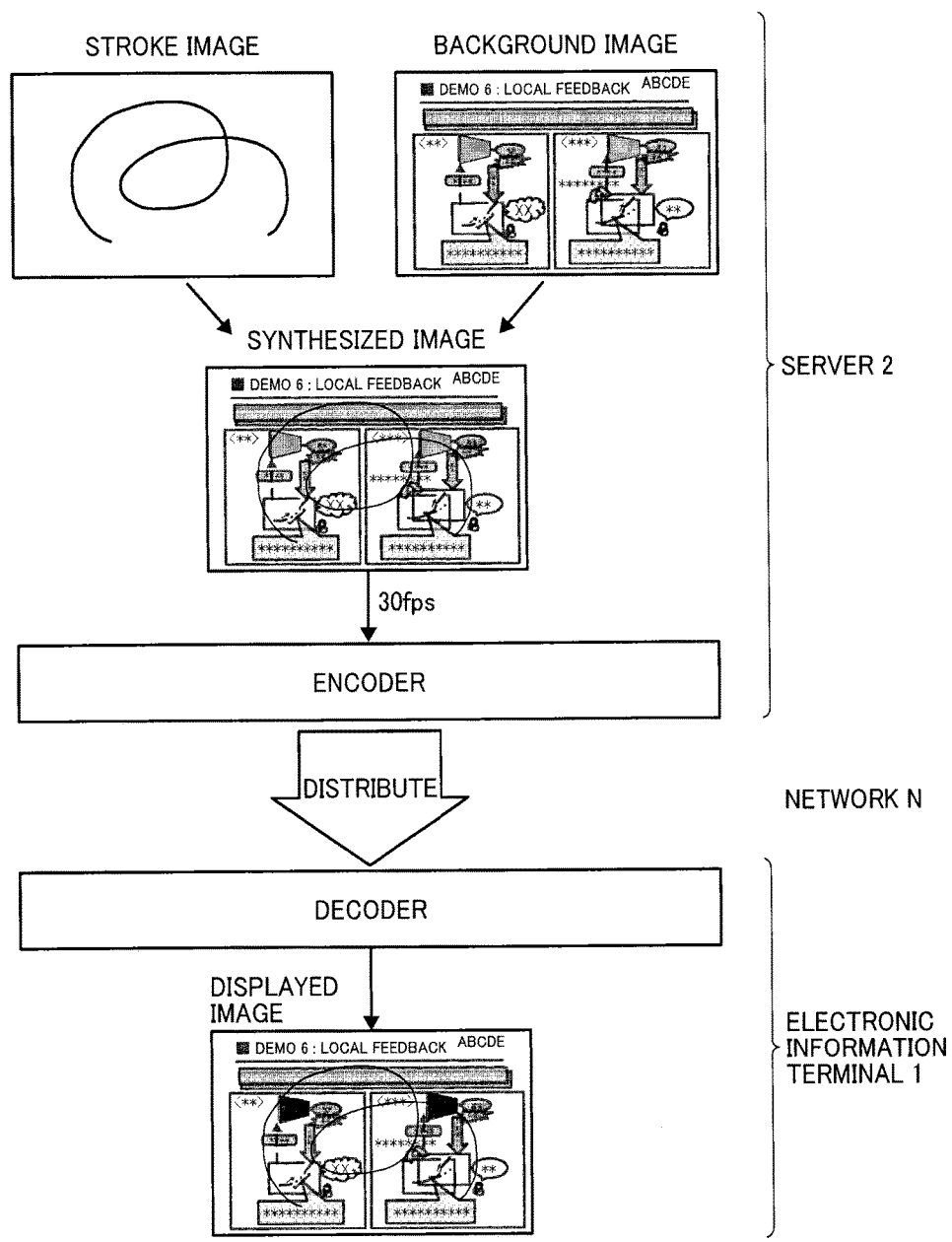
FIG. 6 is a schematic diagram illustrating video distribution performed by the server as an embodiment of the present invention.

FIG. 6 is a schematic diagram illustrating video distribution performed by the server in this embodiment.

The video synthesizer 206 in the server 2 synthesizes strokes generated by the stroke display/edit unit and the background image provided by the background image display unit 205 to generate a video that includes multiple synthesized images. In addition, the video synthesizer 206 encodes the video in predetermined formats such as H.264 (a video compression encoding method) and MPEG-4 (a video compression encoding method for mobile devices) to visualize it. The video transmitter 207 distributes the encoded video data to the electronic information terminal 1.

In the electronic information terminal 1, the video receiver 108 receives the video data and decodes it. The video display controller 109 displays the decoded video on the touch panel display 101.

[A Data Structure of the Operation Event]

Figures 7, 8:
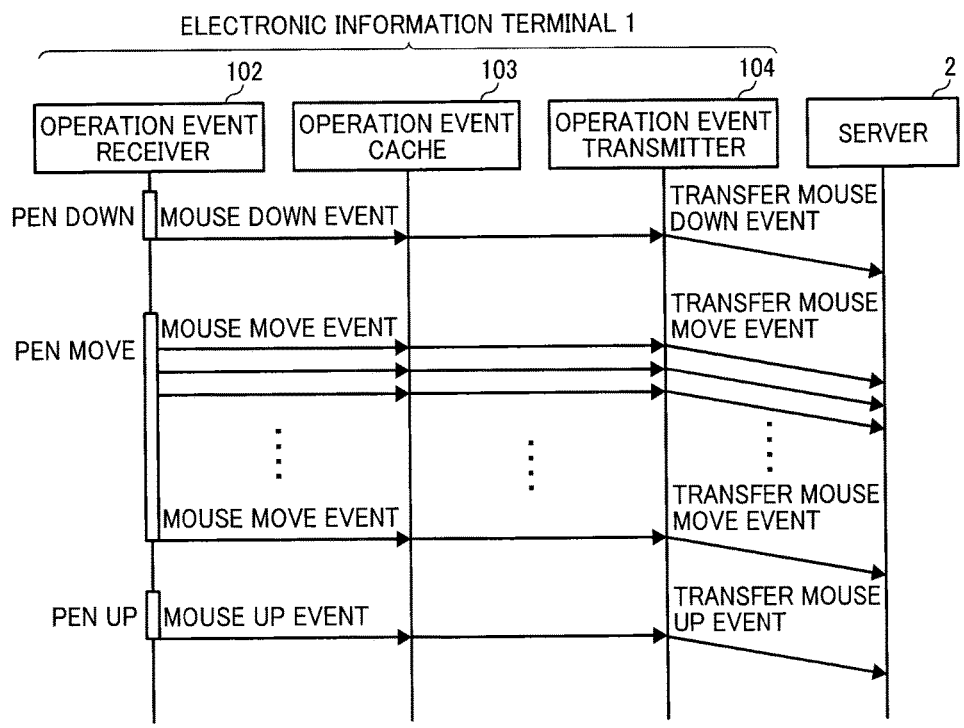
FIG. 7 is a diagram illustrating a data structure of a mouse event as an embodiment of the present invention.
FIG. 8 is a sequence diagram illustrating a process of transferring the mouse event as an embodiment of the present invention.

A data structure of the operation event transferred/received between the electronic information terminal and the server is described below. In the description below, the mouse event is taken as an example of the operation event. FIG. 7 is a diagram illustrating a data structure of the mouse event in this embodiment.

The mouse event includes information on an event name, date/time at which the event occurred, date/time at which the event is transferred to the server, coordinates of the occurred event, and an operated page.

The coordinates information of the event indicates coordinates on the touch panel display 101 and is detected by a coordinates detection unit included in the touch panel display 101.

If the background image in FIG. 6 provided by the background image display unit 205 in the server 2 includes multiple pages, the operated page indicates a page number to be operated.

Here, it is assumed that the mouse event occurs on the electronic information terminal 1 by drawing a stroke on page 1 while the electronic information terminal 1a is disconnected from the communication network. In that case, it is also assumed that the background image distributed by the server 2 is changed into page 2 by operating the other electronic information terminal 1*b* during that period of time. Even if the electronic information terminal 1*a* is connected to the communication network again and transfers the mouse event to the server, since the mouse event includes the information on the operated page, the server can apply the mouse event to the appropriate operated page.

Instead of the mouse event, it is possible to use stylus events such as Stylus_Down, Stylus_Move, and Stylus_Up etc.

[A Process of the Mouse Event when the Network Connection is Appropriate]

FIG. 8 is a sequence diagram illustrating a process of transferring the mouse event in this embodiment. In FIG. 8, the electronic information terminal is connected to the communication network appropriately.

If a stroke is drawn on the touch panel display 101, the mouse event as the operation event occurs. After the operation event receiver 201 receives the mouse event, the mouse event is stored in the operation event cache 103 temporarily. If the electronic information terminal 1 is connected to the server 2 via the communication network N appropriately, the operation event transmitter 104 reads the mouse events sequentially from the operation event cache 103 and transfers them to the server 2.

If a touch of a stylus pen on the touch panel display 101 (i.e., pen-down) is detected by the touch panel display 101, a mouse event MouseDown occurs. The operation event transmitter 104 transfers the mouse event MouseDown to the server 2.

If the touch panel display 101 detects a move of the stylus pen while the stylus pen is touching the touch panel display 101, i.e., PenMove is detected, a mouse event MouseMove occurs. The operation event transmitter 104 transfers the mouse event MouseMove to the server 2. The mouse event MouseMove occurs serially while one stroke is drawn, and each mouse event MouseMove is transferred to the server 2 sequentially. If the touch panel display 101 detects a separation of the stylus pen from the touch panel display 101, i.e., PenUp is detected, a mouse event MouseUp occurs. The operation event transmitter 104 transfers the mouse event MouseUp to the server 2.

The drawing of one stroke starts with PenDown and ends with PenUp. Therefore, one stroke includes the mouse events MouseDown, MouseMove, and MouseUp, and these mouse events are recognized as a series of mouse events. The series of mouse events include one mouse event MouseDown, at least one mouse event MouseMove, and one mouse event MouseUp.

If all of the series of mouse events are transferred to the server 2, the operation event transmitter 104 deletes the series of mouse events that are finished transferring from the operation event cache 103.

For example, each of one MouseDown, at least one MouseMove, and one MouseUp as the series of mouse events occur serially is stored in the operation event cache 103 temporarily and transferred to the server 2 sequentially. If the last mouse event MouseUp among the series of mouse events is transferred to the server 2, the operation event transmitter 104 deletes the series of mouse events MouseDown, MouseMove, and MouseUp from the operation event cache 103.

In the server 2, the operation event receiver 201 receives the mouse events transferred by the electronic information terminal 1 and stores them in the operation event queue 202 temporarily. The stroke display/edit unit 203 reads the mouse events sequentially from the operation event queue 202 and generates image data of the stroke based on the mouse events.

[A Process of the Mouse Event when the Network is Disconnected]

Figure 9:
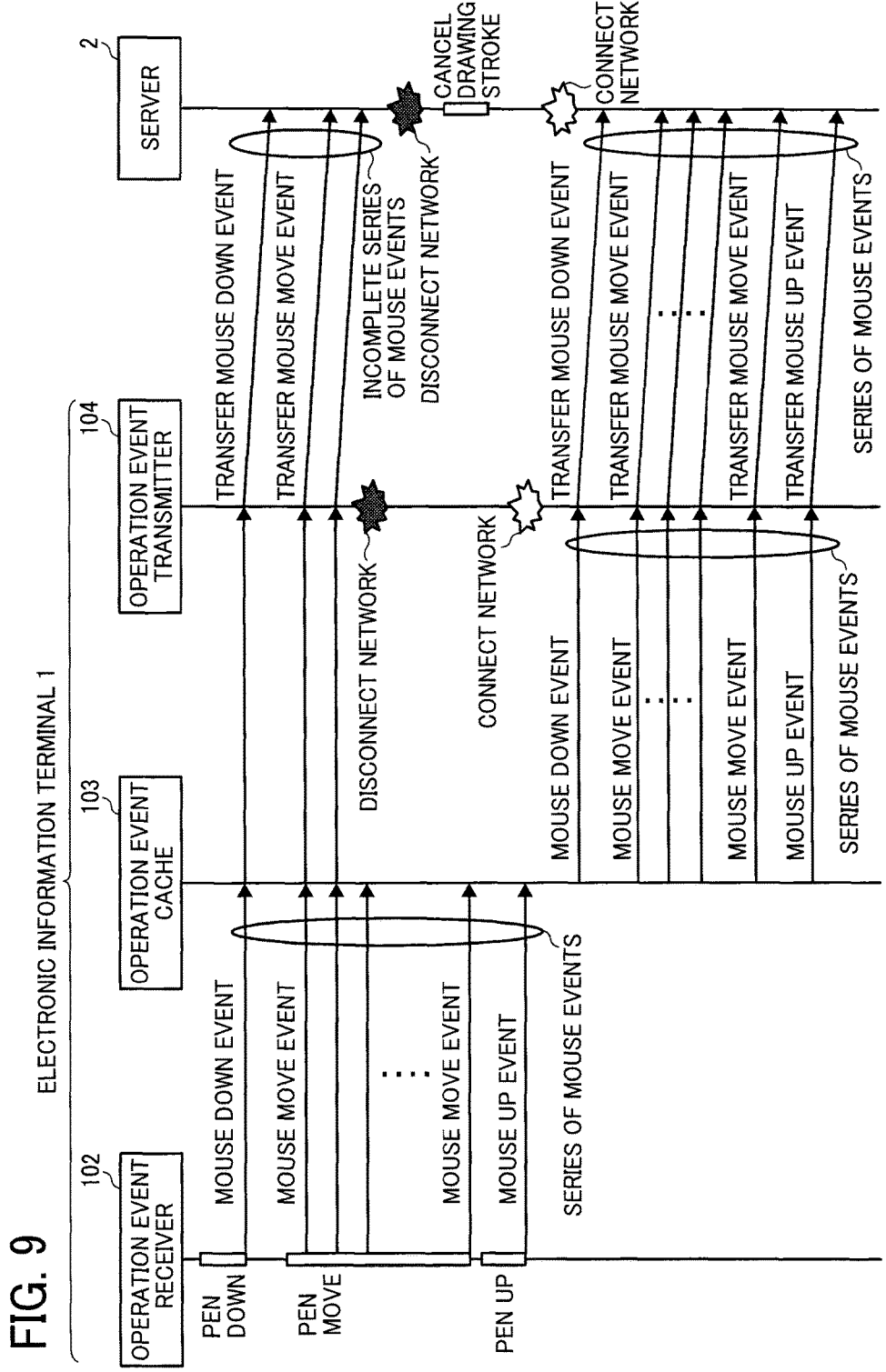
FIG. 9 is a sequence diagram illustrating a process of transferring the mouse event as an embodiment of the present invention.

FIG. 9 is a sequence diagram illustrating a process of transferring the mouse event in this embodiment. The operation event transmitter 104 in the electronic information terminal 1 in this embodiment stores the mouse events in the operation event cache 103 while the network is disconnected and transfers the series of mouse events stored in the operation event cache 103 to the server sequentially from the beginning after the communication network is connected again.

If the operation event occurs in accordance with the operation on the touch panel display 101, the occurred event is stored in the operation event cache temporarily before being transferred to the server 2. The network status management unit 105 always monitors the status of the communication network N, and the operation of the operation event transmitter 104 changes in accordance with the status of the communication network N.

If the network status management unit 105 detects that the communication network is disconnected, the operation event transmitter 104 stops transferring mouse events to the server 2. If the operation on the touch panel display 101 continues while the communication network is disconnected, mouse events occur, and these mouse events are stored in the operation event cache 103 sequentially.

For example, operations of the electronic information terminal 1 and the server 2 when the network status management unit 105 detects that the communication network is disconnected while the series of mouse events are transferred are described below.

Since the operation event transmitter 104 cannot complete transferring the series of mouse events to the server 2, the operation event transmitter 104 does not delete the corresponding event from the operation event cache 103.

On the other hand, the edited stroke status display controller 106 displays an image on the touch panel display 101 based on the operation events received from the operation event receiver 201. That is, while the operation events are reflected on the electronic information terminal, the operation events are not reflected on the server 2.

In the server 2, if the network status management unit 208 detects that the communication network N is disconnected, the stroke display/edit unit 203 deletes the incomplete series of mouse events from the operation event queue 202. The image data is not generated from the incomplete series of mouse events deleted by the stroke display/edit unit 203.

If the network status management unit 105 in the electronic information terminal 1 detects that the communication network is disconnected, the operation event transmitter 104 reads the operation events sequentially from the operation event cache 103 to transfer them to the server 2. In this case, the operation event transmitter 104 reads the series of operation events from the beginning (i.e., from the mouse event MouseDown) to transfer them to the server 2. As a result, after the communication network is connected again, the complete series of operation events are transferred to the server 2, and the stroke display/edit unit 203 in the server 2 can draw the stroke image without interruption.

After transferring all of the series of operation events to the server 2, the operation event transmitter 104 deletes the series of operation events from the operation event cache 103.

In the server 2, the operation event receiver 201 receives the mouse events transferred by the electronic information terminal 1 and stores them in the operation event queue 202 temporarily. The stroke display/edit unit 203 reads the mouse events sequentially from the operation event queue 202 and generates image data of the stroke based on the mouse events.

[Operational Flow in Transferring Events]

Figure 10:
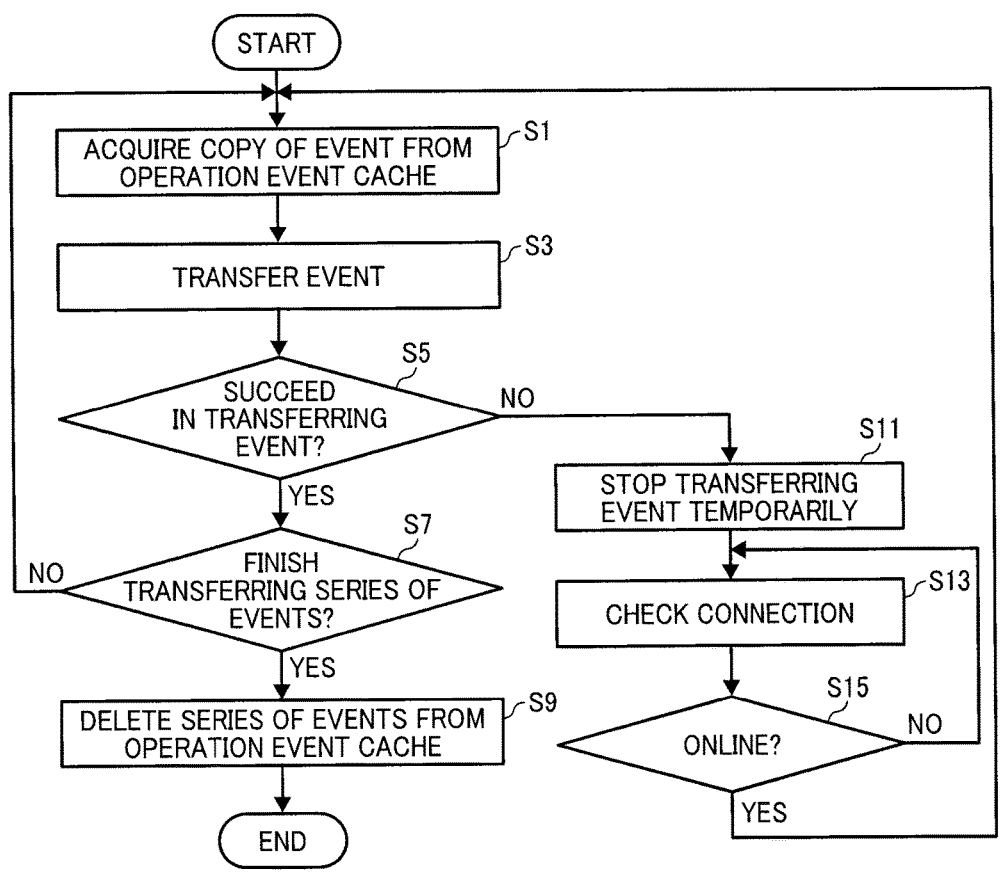
FIG. 10 is a flowchart illustrating a process of transferring the mouse event performed by the electronic information terminal as an embodiment of the present invention.

Operations of the operation event transmitter 104 and the network status management unit 105 in the electronic information terminal 1 are described below. FIG. 10 is a flowchart illustrating a process of transferring the mouse event performed by the electronic information terminal in this embodiment. In the below description, TCP/IP is used for the communication protocol.

In S1, the operation event transmitter 104 picks up the mouse event from the operation event cache 103. That is, the operation event transmitter 104 generates a copy of the mouse event to be transferred among the mouse events stored in the operation event cache 103.

In S3, the operation event transmitter 104 transfers the mouse event picked up from the operation event cache 103 to the server 2.

In S5, the network status management unit 105 checks whether or not the operation event transmitter 104 succeeds in transferring the mouse event each time the operation event transmitter 104 transfers one mouse event. That is, the network status management unit 105 checks whether or not a packet including a response of confirming normally ACK (acknowledge) is sent back from the server 2 within a predetermined period of time after the operation event transmitter 104 transfers the mouse event data.

If the response of confirming normally ACK is received within the predetermined period of time, the network status management unit 105 determines that the operation events have been transferred successfully (YES in S5), and the process proceeds to step S7.

In S7, the operation event transmitter 104 checks whether or not all of the series of operation events have been transferred already.

If operation events that have not been transferred yet exist among the series of operation events (NO in S7), the operation event transmitter 104 performs steps after S1.

If all of the series of operation events have been transferred (YES in S7), the operation event transmitter 104 deletes the series of operation events from the operation event cache 103 in S9.

If new series of operation events to be transferred exist, steps after S1 are performed consecutively.

If the response of confirming normally ACK is not received from the server within the predetermined period of time and the predetermined period of time elapses, the network status management unit 105 determines that it has been failed to transfer the operation event (NO in S5).

In S11, the operation event transmitter 104 stops transferring the operation event temporarily.

In S13, the network status management unit 105 checks the connection with the server 2. More specifically, the network status management unit 105 transfers a SYN (synchronous) packet in which a SYN flag indicating a request for connection is set to 1 to the server 2.

In S15, the network status management unit 105 checks whether or not a SYN/ACK packet in which the SYN flag and the ACK flag are set to 1 is sent back from the server 2 within the predetermined period of time.

If the SYN/ACK packet is not received from the server 2 within the predetermined period of time and the predetermined period of time elapses (NO in S15), the network status management unit 105 performs the step S13 for each predefined time.

If the SYN/ACK packet is received from the server 2 within the predetermined period of time (YES in S15), the operation event transmitter 104 performs steps after S1.

Here, in the step S1 after the communication network is connected again, the operation event transmitter 104 transfers the series of operation events from the beginning (i.e., from the mouse event MouseDown) to the server 2 again.

[Example 1 of Editing a Page]

Figure 11:
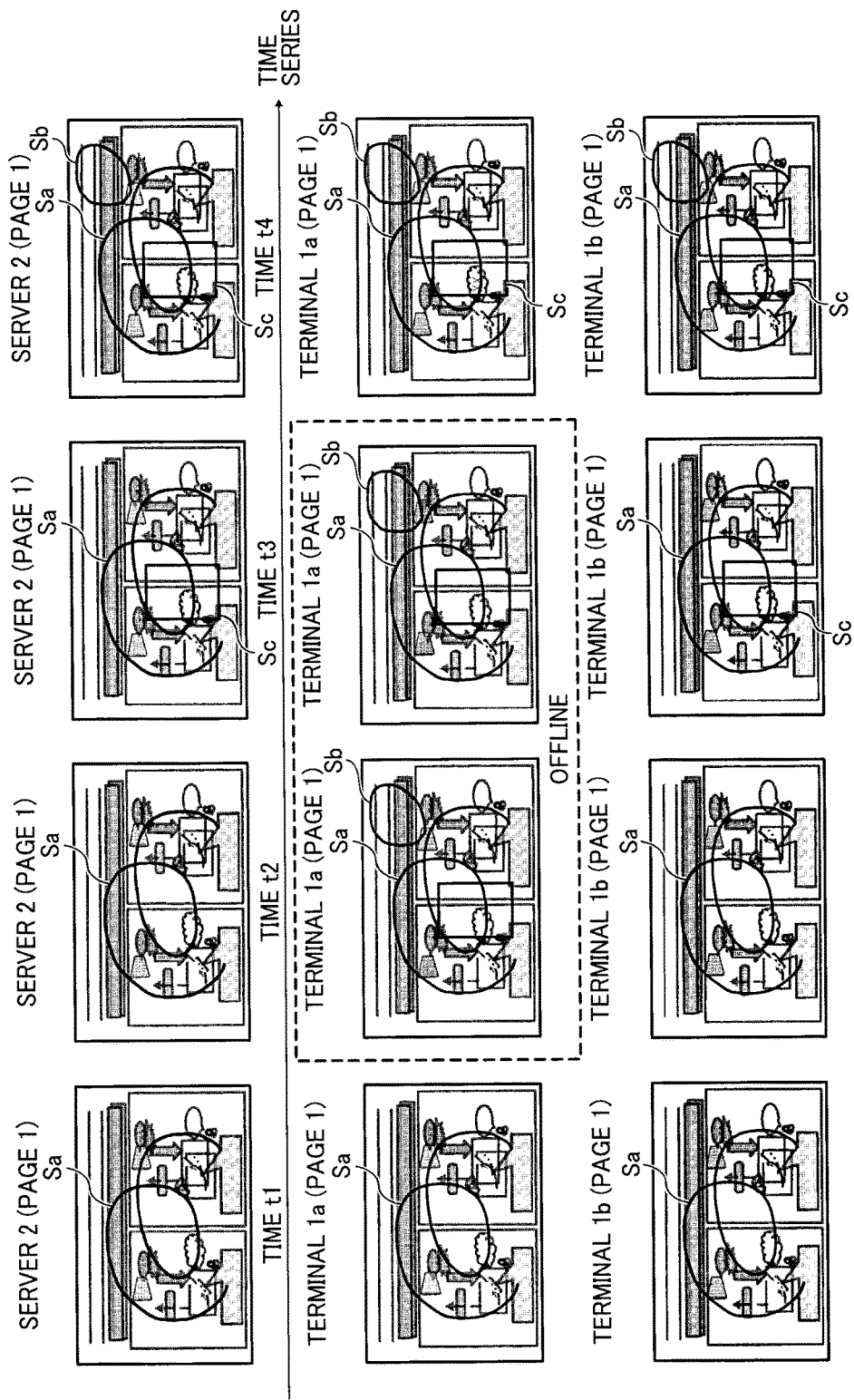
FIG. 11 is a schematic diagram illustrating an image processing if a network connection between the electronic information terminal and the server is disconnected as an embodiment of the present invention.

An example of an image processing performed by the image processing system in this embodiment is described below. FIG. 11 is a schematic diagram illustrating an image processing if a network connection between the electronic information terminal and the server is disconnected.

In FIG. 11, the image processing system includes one server 2 and two electronic information terminals 1a and 1b, a stroke is drawn on the touch panel display on the electronic information terminal 1a, and the stroke data is reflected to the touch panel display on the electronic information terminal 1b via the server.

At time $t_1$, since the server 2 is connected to the electronic information terminals 1a and 1b appropriately via the network, screens on both terminals are synchronized, and a stroke $S_a$ is drawn on an image on page 1 as the background image.

Here, at $t_2$, it is assumed that only the electronic information terminal 1a is disconnected from the communication network and transitions to the off-line state. Although a new stroke Sb is drawn on the electronic information terminal 1a, the stroke Sb is not reflected to the server 2 and the electronic information terminal 1b since the electronic information terminal 1a is off-line.

At $t_3$, it is assumed that a new stroke Sc is drawn on the electronic information terminal 1b and data of the stroke Sc is transferred to the server 2. In this case, while the screens on the server 2 and the electronic information terminal 1b are synchronized, the stroke Sc is not reflected to the screen of the off-line electronic information terminal 1a.

At $t_4$, it is assumed that the network connection of the electronic information terminal 1a is recovered. The electronic information terminal 1a transfers the stroke Sb to the server 2. Since the server 2 distributes the video on which the stroke Sb is drawn in addition to the stroke Sc to the electronic information terminals 1a and 1b, the screens on the server 2 and the electronic information terminals 1a and 1b are synchronized, and the strokes $S_a$ to Sc are drawn on all devices.

[Example 2 of Editing a Page]

Figure 12:
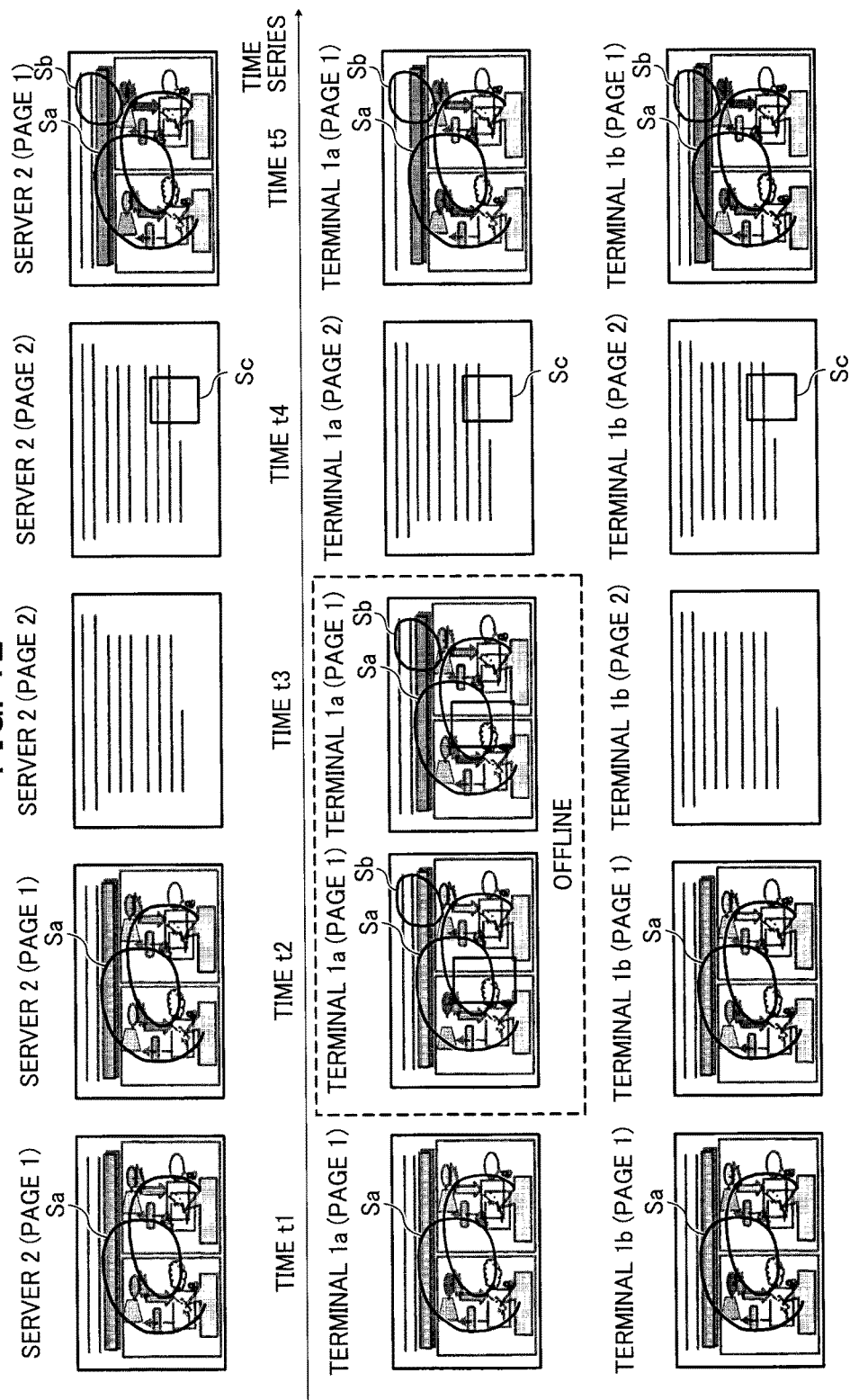
FIG. 12 is a schematic diagram illustrating another image processing if a network connection between the electronic information terminal and the server is disconnected as an embodiment of the present invention.

FIG. 12 is a schematic diagram illustrating another image processing if a network connection between the electronic information terminal and the server is disconnected. In this case, a page displayed on the electronic information terminal is changed while the communication network is disconnected.

At time $t_1$, since the server 2 is connected to the electronic information terminals 1a and 1b appropriately via the network, screens on both terminals are synchronized, and a stroke $S_a$ is drawn on an image on page 1 as the background image.

Here, at $t_2$, it is assumed that only the electronic information terminal 1a is disconnected from the communication network and transitions to the off-line state. Although a new stroke Sb is drawn on the electronic information terminal 1a, the stroke Sb is not reflected to the server 2 and the electronic information terminal 1b since the electronic information terminal 1a is off-line.

At t₃, an event that changes the page displayed on the electronic information terminal 1b into page 2 occurs, and the event is transferred to the server 2. The server 2 generates a video displaying the page 2 based on the event and distributes it to the electronic information terminals 1a and 1b. While the on-line electronic information terminal 1b receives the video and synchronizes the screen with the screen on the server 2, the display change into page 2 is not reflected to the screen on the electronic information terminal 1a since the electronic information terminal 1a is off-line.

At t₄, after the electronic information terminal 1a is connected to the communication network again, the electronic information terminal 1a receives the video distributed by the server 2, and page 2 is displayed on the touch panel display on the electronic information terminal 1a. In case of drawing the stroke Sc on the electronic information terminal 1b, the stroke data is reflected to page 2 by the server 2 to synchronize screens on all devices.

At t₄, the electronic information terminal 1a transfers data of the stroke Sb drawn on page 1 at t₂ to the server 2. While the server 2 generates image data in which data of the stroke Sb is drawn on page 1, the data of the stroke Sb is not reflected visually since page 2 is displayed on the screen.

At t₅, an event that changes the page displayed on either the electronic information terminal 1a or the electronic information terminal 1b into page 1 occurs, and the event is transferred to the server 2. The server 2 generates a video displaying page 1 based on the event and distributes it to the electronic information terminals 1a and 1b. In this case, at t₄, the server 2 generates a video including the stroke Sb transferred by the electronic information terminal 1a, and the electronic information terminals 1a and 1b display the stroke Sb.

[Control Turning the Local Feedback Function On/Off]

The electronic information terminal in this embodiment implements a local feedback function (LFB function), and it is possible to display various operation events such as the mouse event drawn on the terminal on the touch panel display even if the communication network is disconnected. However, to reduce burden on the electronic information terminal, it is preferable to turn the LFB function off if it is unnecessary.

To cope with this issue, in this embodiment, network delay is measured regularly, and the LFB function is turned off if the delay is short enough. By contrast, if the delay becomes long, the LFB function is turned on.

Figure 13:
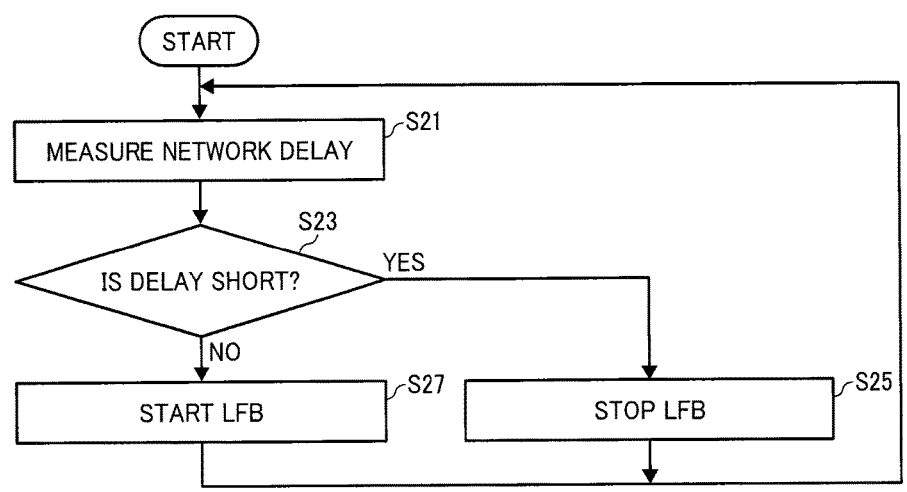
FIG. 13 is a flowchart illustrating a process of turning a local feedback (LFB) performed by a network status management unit on and off.

The control turning the LFB function on and off is described below. FIG. 13 is a flowchart illustrating a process of turning a LFB function performed by a network status management unit on and off.

In S21, the network status management unit 105 measures network delay time (round trip time (RTT)). That is, the network status management unit 105 requests the server 2 to transfer data and measures time until the result is sent back.

In S23, the network status management unit 105 checks whether or not the RTT is less than a predetermined threshold value.

If the RTT is less than the predetermined threshold value (if the network delay is short, YES in S23), the network status management unit 105 transfers a command signal to stop operation to the edited stroke status display controller 106 and turns the LFB function off in S25.

If the RTT is equal to or more than the predetermined threshold value (if the network delay is long, NO in S23), the network status management unit 105 transfers a command signal to start operation to the edited stroke status display controller 106 and turns the LFB function on in S27.

The network status management unit 105 measures the delay time at predefined intervals.

In this embodiment, since the LFB function is turned off if the network delay time is short enough, it is possible to reduce burden on the electronic information terminal. By contrast, since the LFB function is turned on if the network delay time is long, it is possible to enhance usability.

[A Second Process of the Mouse Event when the Network is Disconnected]

A second process of the mouse event by the server when the network is disconnected is described below with reference to FIG. 9.

In the embodiment described above, if the network status management unit 208 detects that the communication network N is disconnected, the image data is not generated from the incomplete series of mouse events.

However, if the network status management unit 208 in the server 2 detects that the communication network N is disconnected, it is possible that the stroke display/edit unit 203 generates image data based on the received mouse events among incomplete series of mouse events. As a result, it is possible to reflect stroke data from the beginning to just before the electronic information terminal 1 is disconnected from the communication network N to the image data.

Second Embodiment

An image processing system in this embodiment is described below. In the image processing system in this embodiment, if the server performs a process such as drawing a stroke based on the mouse event transferred by the electronic information terminal, the electronic information terminal is notified to erase the LFB stroke drawn on the electronic information terminal.

In the below description, descriptions on configurations same as previous embodiment is omitted accordingly.

<A Functional Configuration of the Electronic Information Terminal and the Server>

Figure 14:
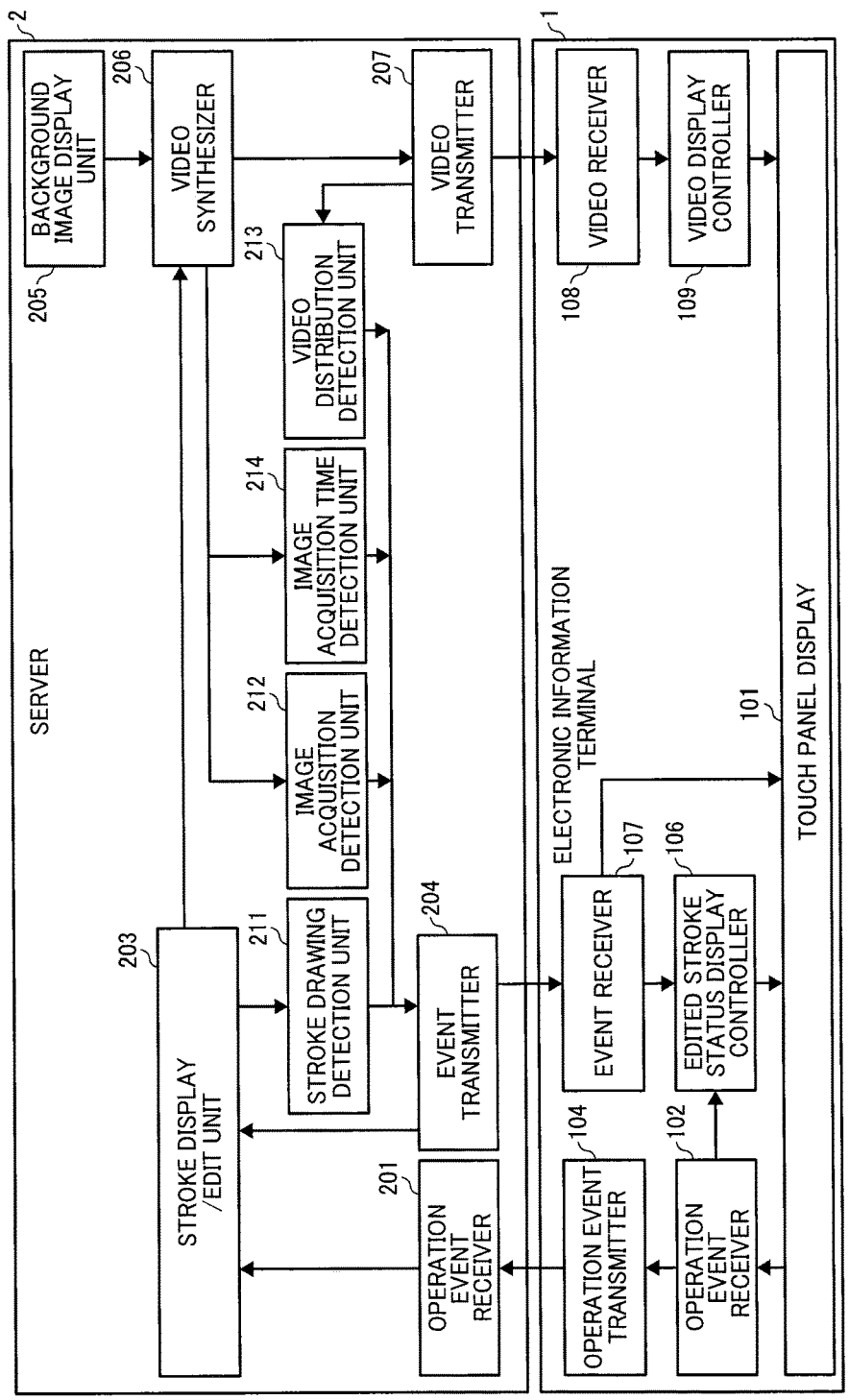
FIG. 14 is a diagram illustrating functional blocks of the electronic information terminal and the server as a second embodiment of the present invention.

FIG. 14 is a diagram illustrating functional blocks of the electronic information terminal and the server in the second embodiment. In FIG. 14, same symbols are assigned to configuration same as FIG. 3, and different configurations are described below mainly.

The server 2 includes a stroke drawing detection unit 211 and an image acquisition detection unit 212.

The stroke drawing detection unit 211 detects a drawing status of a stroke by the stroke display/edit unit 203. After the stroke display/edit unit 203 finishes drawing the series of strokes, i.e., the stroke is drawn at coordinates indicated by the mouse event MouseUp, it is detected to finish drawing the series of strokes.

The image acquisition detection unit 212 detects whether or not the video synthesizer 206 acquires the image generated by the stroke display/edit unit 203.

The electronic information terminal 1 in this embodiment is different from the electronic information terminal in FIG. 3 in not including the transmission operation event cache 103 and the network status management unit 105. The server 2 in this embodiment is different from the server in FIG. 3 in not including the operation event queue 202 and the network status management unit 208. However, it is still possible that the electronic information terminal 1 and the server 2 in this embodiment include the configuration described above.

<A Data Structure of the Operation Event>

Figures 15, 16:
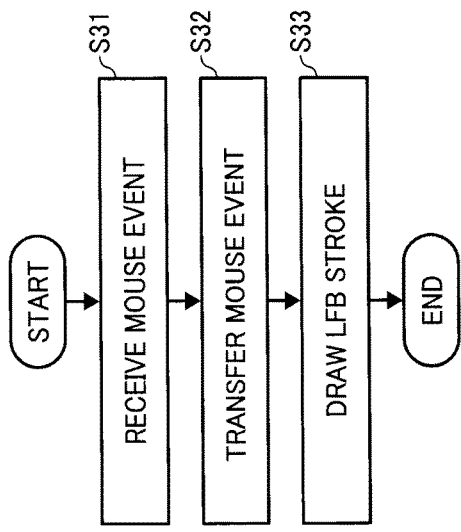
FIG. 15 is a diagram illustrating a data structure of a mouse event as the second embodiment of the present invention.
FIG. 16 is a flowchart illustrating a process of drawing a LFB stroke performed by the electronic information terminal as the second embodiment of the present invention.

FIG. 15 is a diagram illustrating a data structure of a mouse event in the second embodiment.

The mouse event in this embodiment transferred to the server includes a LFB stroke ID in addition to the information shown in FIG. 7. The LFB stroke ID is a unique ID indicating a series of strokes, and the same LFB stroke ID is assigned to the mouse events that constitute the series of strokes.

<A Process of Drawing the LFB Stroke>

FIG. 16 is a flowchart illustrating a process of drawing a LFB stroke performed by the electronic information terminal in this embodiment. Here, the basic operation is the same as described in FIG. 4.

After drawing a stroke by touching the touch panel display 101 on the electronic information terminal 1 etc., the mouse event occurs as the operation event (corresponding to S101 in FIG. 4).

The operation event receiver 102 receives the mouse event from the touch panel display 101 in S31. The operation event receiver 102 assigned the LFB stroke ID to the occurred mouse event. The data structure of the mouse event is shown in FIG. 15.

In S32, the operation event transmitter 104 receives the mouse event from the operation event receiver 102 to transfer the mouse event to the server 2 in S33. The mouse event described above includes the LFB stroke ID. This step corresponds to step S102 in FIG. 4.

In S33, after receiving the mouse event including the information on the LFB stroke ID from the operation event receiver 102, the edited stroke statue display controller 106 generates a stroke based on the mouse event and displays it on the touch panel display 101. This step corresponds to step S103 in FIG. 4.

<A Process of Notifying of Erasing the LFB Stroke>

Figure 17:
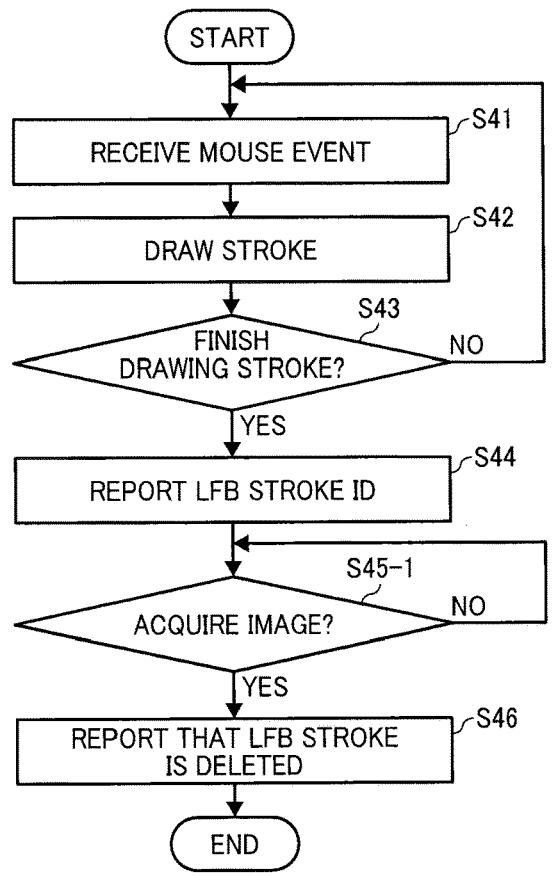
FIG. 17 is a flowchart illustrating a process of reporting that the LFB stroke is to be erased performed by the server as the second embodiment of the present invention.

FIG. 17 is a flowchart illustrating a process of reporting that the LFB stroke is to be erased performed by the server in the second embodiment.

In S41, the operation event receiver 201 in the server 2 receives the mouse event transferred by the electronic information terminal 1.

In S42, the stroke display/edit unit 203 generates an image on which the stroke based on the mouse event received from the operation event receiver 201 is drawn. This step corresponds to step S201 in FIG. 4.

If the mouse event MouseDown is received, the stroke display/edit unit 203 generates a new series of strokes and draws a stroke that starts from the coordinates included in the received mouse event. If the mouse event other than MouseDown is received, the stroke display/edit unit 203 draws a stroke adding coordinates included in the mouse event received during the series of strokes that has already been generated.

In S43, the stroke drawing detection unit 211 determines whether or not it is finished drawing the series of strokes by the stroke display/edit unit 203.

If the stroke drawing detection unit 211 detects that the stroke display/edit unit 203 finishes drawing the series of strokes (YES in S43), the process proceeds to S44. That is, if the stroke display/edit unit 203 draws the stroke based on the mouse event MouseUp, the stroke drawing detection unit 211 detects that and determines that it is finished drawing the series of strokes.

If the stroke drawing detection unit 211 does not detect that it is finished drawing the series of strokes (NO is S43), the process proceeds to S41 and S42. That is, if the stroke display/edit unit 203 draws the stroke based on the mouse events MouseDown and MouseMove, the stroke drawing detection unit 211 detects that and determines that it is not finished drawing the series of strokes.

In S44, the stroke drawing detection unit 211 notifies the event transmitter 204 that it is finished drawing the series of strokes and reports the LFB stroke ID of the series of strokes that has been finished drawing to the event transmitter 204. The LFB stroke ID is acquired from the stroke display/edit unit 203.

In S45-1, the image acquisition detection unit 212 detects whether or not the video synthesizer 206 acquires the image generated by the stroke display/edit unit 203. If it is detected (YES in S45-1), the process proceeds to S46.

In S46, the event transmitter 204 transfers a LFB stroke erasing notification including the LFB stroke ID to be erased to the electronic information terminal 1.

<An Image is Generated and Played Back>

The steps of generating and distributing the image by the server 2 are the same as steps S202 and S203 in FIG. 4.

In addition, the step of decoding and displaying the video by the electronic information terminal 1 is the same as step S104 in FIG. 4.

<A Process of Erasing the LFB Stroke>

Figure 18:
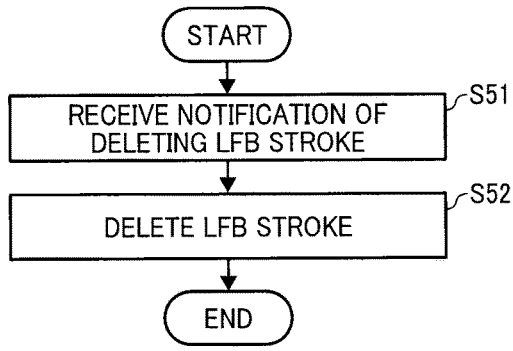
FIG. 18 is a flowchart illustrating a process of erasing the LFB stroke performed by the electronic information terminal that received a LFB stroke erasing notification.

FIG. 18 is a flowchart illustrating a process of erasing the LFB stroke performed by the electronic information terminal that received a LFB stroke erasing notification.

In S51, the event receiver 107 receives the LFB stroke erasing notification from the server 2 and reports it to the edited stroke status display controller 106.

In S52, the edited stroke status display controller 106 erases the LFB stroke whose LFB stroke ID is the same as the LFB stroke ID included in the LFB stroke erasing notification.

In this case, it is possible that the edited stroke status display controller 106 does not erase the LFB stroke to be erased immediately just after receiving the LFB stroke erasing notification and erases the LFB stroke to be erased after a predetermined period of time expires after receiving the erasing notification. In addition, if the edited stroke status display controller 106 performs a fade-out animation that the LFB stroke fades out in erasing the LFB stroke, it is possible to change into the background image preferably.

<An Advantage>

In the so-called LFB function, the LFB stroke drawn on the electronic information terminal temporarily is faded out after the predetermined period of time expires. If the timing of fading out the LFB stroke is not controlled appropriately, it is possible that the LFB stroke is faded out before the video on which the stroke is drawn is displayed and it takes too long to fade out the LFB stroke etc.

In this embodiment, if the video synthesizer in the server acquires the image on which the stroke is drawn, the LFB stroke erasing notification corresponding to the stroke is transferred to the electronic information terminal. After receiving the erasing notification, the electronic information terminal erases the LFB stroke that includes the notified ID. As a result, on the electronic information terminal, it is possible to erase the LFB stroke naturally and pleasantly.

[A First Example of the Second Embodiment]

In the second embodiment, it takes long that the video synthesizer 206 acquires the image, generates the video, and encodes the video in the predetermined format.

To cope with this issue, it is possible that the event transmitter 204 includes a timer, the timer times a predetermined period of time after the image acquisition detection unit 212 detects that the video synthesizer 206 acquires the image from the stroke display/edit unit 203, and the LFB stroke erasing notification is transferred to the electronic information terminal 1 after a predetermined period of time expires after the image acquisition detection unit 212 detects that.

As a result, on the electronic information terminal, it is possible to erase the LFB stroke naturally and pleasantly.

[A Second Example of the Second Embodiment]

In the second embodiment, it takes long that the video synthesizer 206 acquires the image, generates the video, and encodes the video in the predetermined format. To cope with this issue, it is possible that the image acquisition detection unit 212 in the server 2 functions as a video generation detection unit to detect that the video synthesizer 206 generates the video based on the acquired image.

Figure 19:
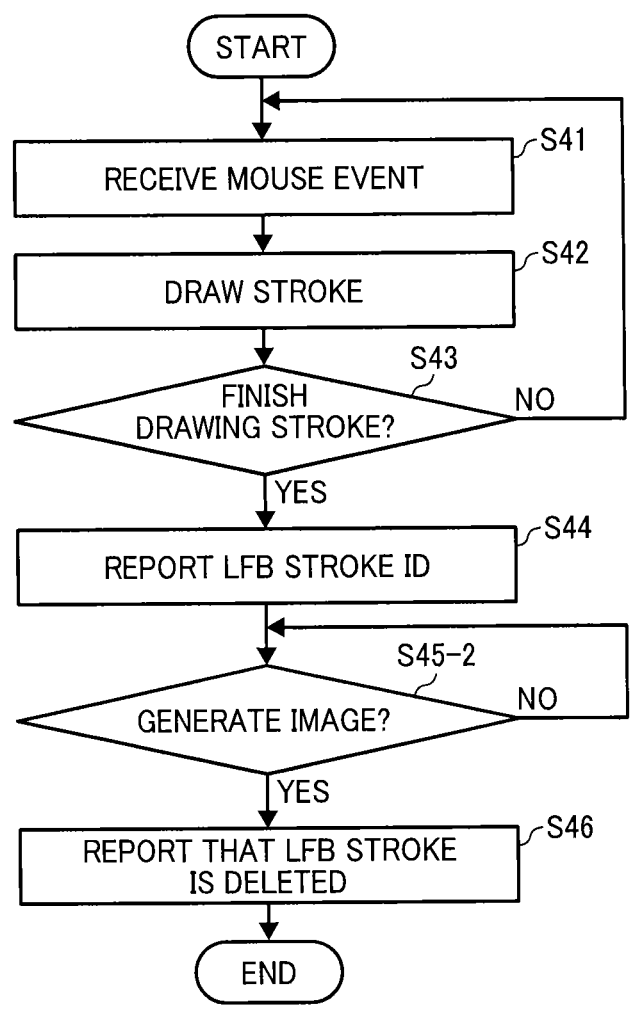
FIG. 19 is a flowchart illustrating a process of reporting that the LFB stroke is to be erased performed by the server.

FIG. 19 is a flowchart illustrating a process of reporting that the LFB stroke is to be erased performed by the server. In the description below, only steps different from the flowchart in FIG. 17 are described.

In S45-2, if the image acquisition detection unit 212 detects that the video has been generated (YES in S45-2), the process proceeds to S46.

As a result, on the electronic information terminal, it is possible to erase the LFB stroke naturally and pleasantly.

[A Third Example of the Second Embodiment]

In the second embodiment, it takes long that the video synthesizer 206 acquires the image, generates the video, and encodes the video in the predetermined format.

To cope with this issue, it is possible that the server 2 includes a video transmission detection unit 213 that detects the transferring status of the video by the video transmitter 207. When the video transmitter 207 finishes transferring the video regarding the series of strokes, the video transmission detection unit 213 notifies of that.

Figure 20:
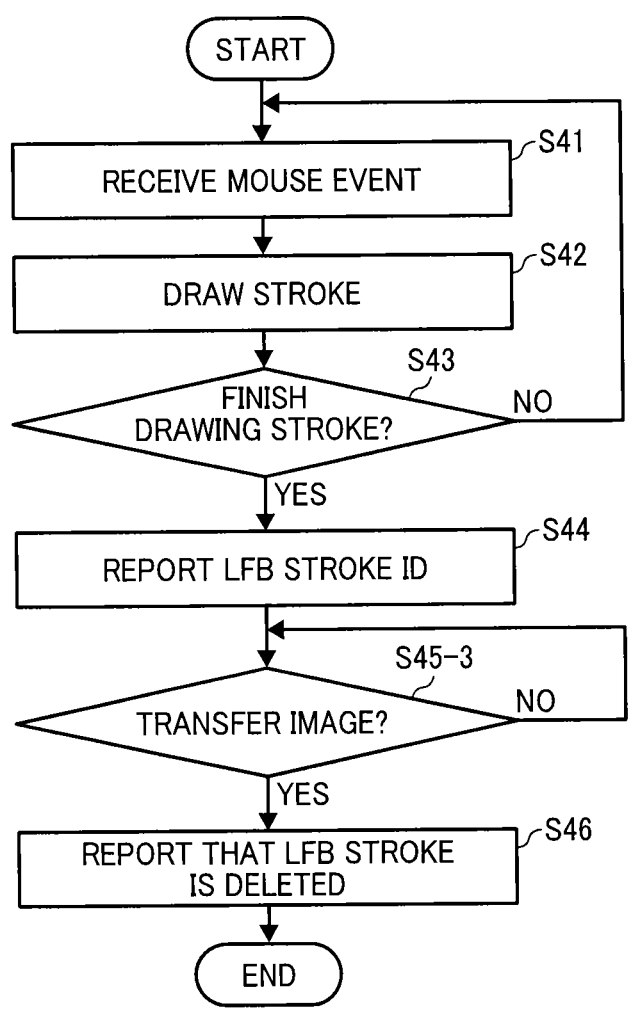
FIG. 20 is a flowchart illustrating a process of reporting that the LFB stroke is to be erased performed by the server.

FIG. 20 is a flowchart illustrating a process of reporting that the LFB stroke is to be erased performed by the server. In the description below, only steps different from the flowchart in FIG. 17 are described.

In S45-3, the video transmission detection unit 213 detects whether or not the video transmitter 207 transfers a part of a frame including the series of strokes among the videos generated by the video synthesizer 206 to the electronic information terminal 1. If it is detected (YES in S45-3), the process proceeds to S46. Here, the video generated by the video synthesizer 206 is the video that the video synthesizer 206 generates based on the image acquired from the stroke display/edit unit 203.

As described above, in this embodiment, since the event transmitter 204 transfers the LFB stroke erasing notification when the video transmitter 207 finishes transferring the video, it is possible that the electronic information terminal erases the LFB stroke naturally and pleasantly.

[A Fourth Example of the Second Embodiment]

In the second embodiment and the above examples in the second embodiment, when the server 2 draws the stroke to generate the image, the LFB stroke erasing notification is transferred to the electronic information terminal 1. However, in case of receiving the mouse event from the electronic information terminal 1, it is possible that the server 2 transfers the LFB stroke erasing notification to the electronic information terminal 1 before drawing the stroke.

In this case, the electronic information terminal 1 erases the target LFB stroke after a predetermined period of time expires after receiving the LFB stroke erasing notification. Here, the predetermined period of time described above is set to equal to or more than desired time from the LFB stroke erasing notification is received to the server 2 transfers the video including the stroke corresponding to the LFB stroke to be erased and the electronic information terminal 1 displays the video.

As a result, while the operation on the server 2 can be simplified, on the electronic information terminal, it is possible to erase the LFB stroke naturally and pleasantly.

[A Third Embodiment]

The third embodiment in the present invention is described below. In this embodiment, by setting playback delay time that specifies time when the electronic information terminal play backs a video, in playing back the video by multiple electronic information terminals simultaneously, it is possible to adjust timing of erasing the LFB stroke in accordance with the playback delay time.

In this embodiment, to play back the video by the multiple electronic information terminals 1 simultaneously, the server 2 sets the playback delay time for each electronic information terminal 1. Here, the playback delay time is determined considering time shift between the server 2 and the electronic information terminal 1. The playback delay time indicates time interval until the electronic information terminal 1 starts playing back the video using time when the video synthesizer 206 acquires the image generated by the stroke display/edit unit 203 as a standard.

As described above, by controlling playing back the video at the time acquired by adding the playback delay time to the time when the video synthesizer 206 acquires the image, it is possible to play back the video by the multiple electronic information terminals 1 simultaneously.

Since the video transmitter 207 in the serve 2 sets the playback delay time when the electronic information terminal 1 starts communicating with the server 2 based on the time shift between the server 2 and the electronic information terminal 1, the video transmitter 207 functions as a playback delay time setting unit. In addition, the video transmitter 207 stores the playback delay time.

As shown in FIG. 14, the server 2 in this embodiment includes an image acquisition time detection unit 214 that detects image acquisition time when the video synthesizer 206 acquires the image generated by the stroke display/edit unit 203.

In addition, the video transmitter 207 functions as a unit that sets the playback delay time to each of the electronic information terminal 1 and stores them.

The event transmitter 204 functions as a playback delay time acquisition unit that acquires the playback delay time from the video transmitter 207. The event transmitter 204 includes the image acquisition time acquired by the image acquisition time detection unit 214 and the playback delay time acquired from the video transmitter 207 in the LFB stroke erasing notification to transfer it to the electronic information terminal 1.

Since each electronic information terminal 1 in this embodiment can recognize the playback time of the video clearly, the erasing timing of the LFB stroke is adjusted for each of the electronic information terminals 1.

<A Process of Notifying of Erasing the LFB Stroke>

Figure 21:
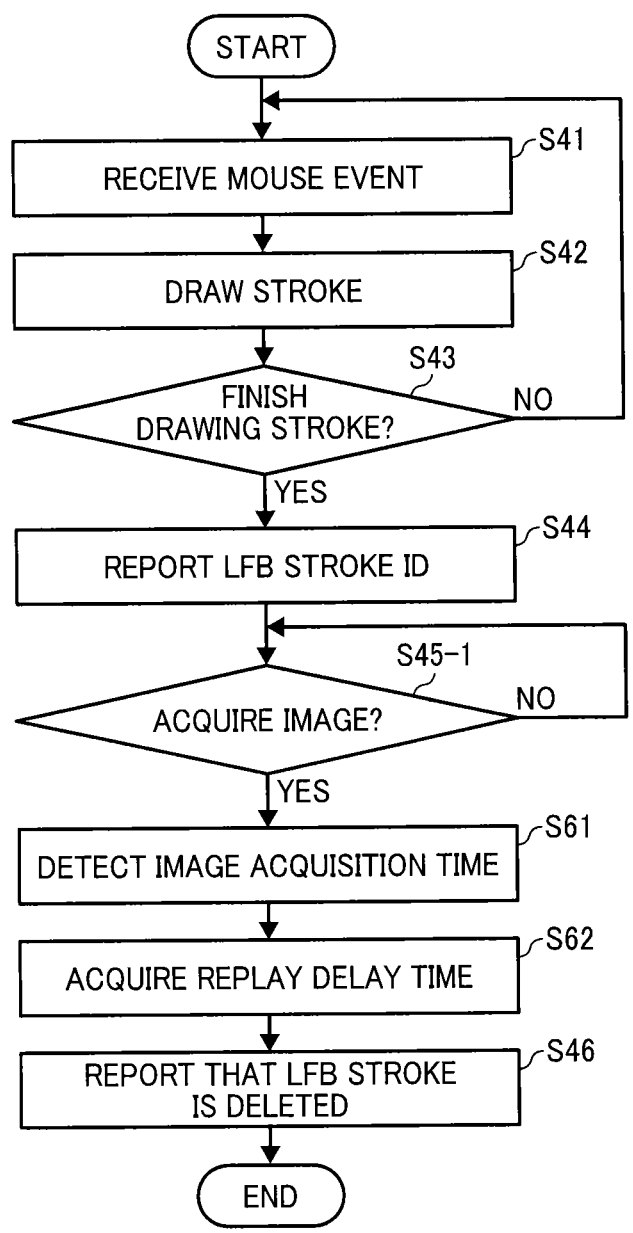
FIG. 21 is a flowchart illustrating a process of reporting that the LFB stroke is to be erased performed by the server as a third embodiment of the present invention.

FIG. 21 is a flowchart illustrating a process of reporting that the LFB stroke is to be erased performed by the server in the third embodiment. In FIG. 21, same symbols are assigned to the same steps as shown in FIG. 17, and the descriptions for those steps are omitted.

Each unit in the server 2 performs steps S41 to S45-1.

In S45-1, if the image acquisition detection unit 212 detects that the video synthesizer 206 acquires the image (YES in S45-1), the process proceeds to S61.

In S61, the image acquisition time detection unit 214 detects the time when the video synthesizer 206 acquires the image from the stroke display/edit unit 203 and acquires the time. The time that the image acquisition time detection unit 214 acquires is reported to the event transmitter 204.

In S62, the event transmitter 204 acquires the playback delay time stored in the video transmitter 207.

In S46, the event transmitter 204 transfers a LFB stroke erasing notification to the electronic information terminal 1. Compared to the process in FIG. 17, the LFB stroke erasing notification in this embodiment includes the image acquisition time and the playback delay time in addition to the LFB stroke ID to be erased.

<A Process of Erasing the LFB Stroke>

Figure 22:
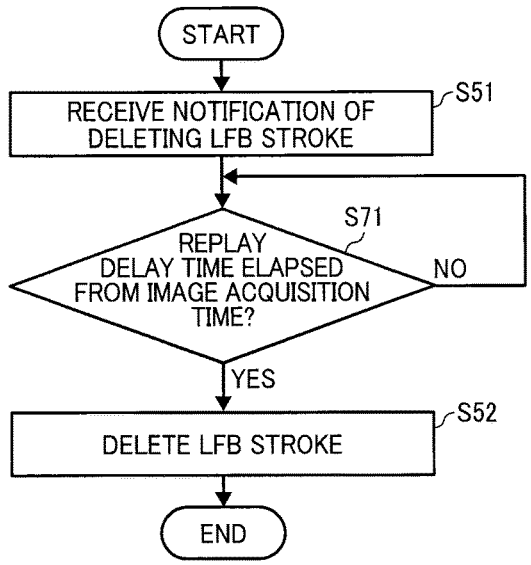
FIG. 22 is a flowchart illustrating a process of erasing the LFB stroke performed by the electronic information terminal that received a LFB stroke erasing notification.

FIG. 22 is a flowchart illustrating a process of erasing the LFB stroke performed by the electronic information terminal that received the LFB stroke erasing notification. Same symbols are assigned to steps that are the same as in FIG. 18.

In S51, the event receiver 107 receives the LFB stroke erasing notification from the server 2 and reports it to the edited stroke status display controller 106.

In S71, the edited stroke status display controller 106 determines whether or not it becomes time adding the playback delay time to the image acquisition time. If the time arrives (YES in S71), the process proceeds to S52.

In S52, the edited stroke status display controller 106 erases the LFB stroke whose LFB stroke ID is the same as the LFB stroke ID included in the LFB stroke erasing notification.

<An Advantage>

As described above, if the playback delay time is set so that the video can be played back by multiple electronic information terminals, by reporting the playback delay time to the edited stroke status display controller 106, it is possible to erase the LFB stroke at the same time when the video is played back. As a result, it is possible to display the video reasonably.

[Fourth Embodiment]

The fourth embodiment in the present invention is described below. In this embodiment, the LFB stroke erasing notification is transferred for each mouse event.

<A Process of Notifying of Erasing the LFB Stroke>

Figure 23:
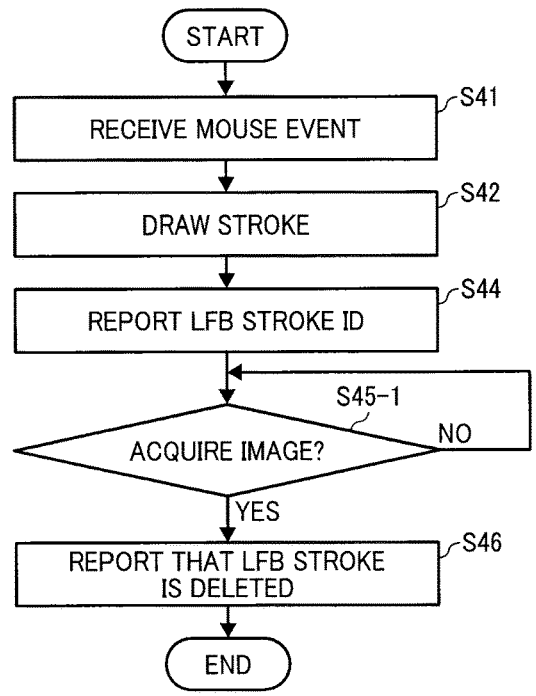
FIG. 23 is a flowchart illustrating a process of reporting that the LFB stroke is to be erased performed by the server as a fourth embodiment of the present invention.

FIG. 23 is a flowchart illustrating a process of reporting that the LFB stroke is to be erased performed by the server in the fourth embodiment. In FIG. 23, same symbols are assigned to the same steps as shown in FIG. 17, and the descriptions for those steps are omitted. Compared to the flowchart in FIG. 17, step S43 is omitted in the flowchart in FIG. 23.

Each unit in the server 2 performs steps S41 and S42.

In S44, the stroke drawing detection unit 211 acquires the LFB stroke ID of the stroke drawn by the stroke display/edit unit 203 and coordinates of the stroke for each mouse event. The stroke drawing detection unit 211 reports the acquired LFB stroke ID and its coordinates to the event transmitter 204.

In S45-1, the image acquisition detection unit 212 detects whether or not the video synthesizer 206 acquires the image generated for each mouse event by the stroke display/edit unit 203. If it is detected (YES in S45-1), the process proceeds to S46.

In S46, the event transmitter 204 transfers a LFB stroke erasing notification to the electronic information terminal 1. The LFB stroke erasing notification includes the coordinates of the LFB stroke to be erased in addition to the LFB stroke ID to be erased received via the stroke drawing detection unit 211.

Instead of the coordinates, it is possible to use a unique mouse event ID assigned to each mouse event. In this case, if the operation event receiver 102 in the electronic information terminal 1 receives the mouse event from the touch panel display 101, the LFB stroke ID and the mouse event ID are assigned to the mouse event. It is possible that the electronic information terminal 1 transfers the mouse event including both IDs to the server 2 and server 2 includes the mouse event ID in the LFB stroke erasing notification.

<A Process of Erasing the LFB Stroke Partially>

A LFB stroke erasing process performed by the electronic information terminal in this embodiment that received the LFB stroke erasing notification is described below with reference to FIG. 18.

In S51, the event receiver 107 receives the LFB stroke erasing notification from the server 2 and reports it to the edited stroke status display controller 106. In addition to the LFB stroke ID, the LFB stroke erasing notification includes the coordinates of the stroke to be erased or the mouse event ID among the LFB strokes to which the LFB stroke ID is assigned.

In S52, the edited stroke status display controller 106 erases a stroke whose coordinates or mouse event ID is included in the LFB stroke erasing notification. Since the LFB stroke is erased for each coordinates or mouse event ID, the LFB strokes are erased in chronological order. When all coordinates in the series of LFB strokes or all the mouse event IDs are erased, the series of LFB strokes is completely erased.

FIG. 24 is a schematic diagram illustrating a process of erasing the LFB stroke partially in stages. In FIG. 24, the local feedback layer 101b in FIG. 5 is illustrated.

At $t_1$, if something is handwritten on the touch panel display using an electronic pen etc. by user operation, an image of the LFB stroke $S_d$ is drawn on the local feedback layer 101b sequentially using the LFB process performed by the electronic information terminal 1.

At $t_2$, it is finished to draw the series of LFB strokes $S_d$.

At $t_3$, the local feedback layer 101b that receives the LFB stroke erasing notification is illustrated. The LFB stroke $S_d$ is erased from a part of the LFB stroke Se that was drawn in the past in chronological order.

<Advantages>

As described above, in this embodiment, since the LFB stroke is erased for each mouse event, the LFB stroke is erased in chronological order. Since the LFB stroke is erased sequentially, it is possible to reduce visual discomfort.

The present invention also encompasses a non-transitory recording medium storing a program that executes an information processing method. The information processing method includes the steps of storing stroke data to be transferred temporarily, detecting a status of a communication network to which an electronic information terminal is connected, and transferring the stroke data to an image processing apparatus via the communication network in accordance with the detected status of the communication network.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. An electronic information terminal, comprising:
   a transmission memory to store, temporarily, stroke data to be transferred, the stroke data being drawn by a user on a display of the electronic information terminal;
   processing circuitry configured to detect a status of a communication network to which the electronic information terminal is connected; and
   a transmitter to transfer the stroke data read from the transmission memory to an image processing apparatus via the communication network, in accordance with the status of the communication network detected by the processing circuitry,
   wherein the processing circuitry is further configured to measure a communication network delay time, and cause a display to display a first image generated by the processing circuitry from the stroke data stored in the transmission memory, when the measured communication network delay time is equal to or longer than a predetermined threshold value.

2. The electronic information terminal according to claim 1, wherein the processing circuitry is further configured to control the display of the first image generated from the stroke data.

3. The electronic information terminal according to claim 1, wherein the processing circuitry is further configured to cause the display to stop displaying the first image, when the measured communication network delay time is shorter than the predetermined threshold value.

4. The electronic information terminal according to claim 1, wherein the transmitter is configured to delete a series of stroke data from the transmission memory after transferring the series of stroke data to the image processing apparatus.

5. The electronic information terminal according to claim 2, wherein the processing circuitry is further configured to delete the first image when a deletion notification is received from the image processing apparatus.

6. An image processing apparatus, comprising:
   a receiver to receive, via a communication network, stroke data drawn by a user on a display of an electronic information terminal, the electronic information terminal being configured to display a first image generated from the stroke data;
   a reception memory to store, temporarily, the stroke data received from the electronic information terminal,
   processing circuitry to generate a second image based on the received stroke data, wherein the processing circuitry is configured to generate the second image based on an incomplete series of stroke data stored in the reception memory when the processing circuitry detects that the communication network is disconnected while the series of stroke data is received: and
   a video transmitter configured to transfer a video generated from the second image to the electronic information terminal.

7. The image processing apparatus according to claim 6, wherein the processing circuitry is further configured to generate the second image after the series of stroke data is stored in the reception memory.

8. The image processing apparatus according to claim 7, further comprising:
   a transmitter to transfer, to the electronic information terminal, a deletion notification indicating that the first image generated by the electronic information terminal is to be deleted.

9. The image processing apparatus according to claim 8, wherein the transmitter is further configured to transfer the deletion notification to the electronic information terminal when the video is transferred.

10. The image processing apparatus according to claim 8, wherein the processing circuity is further configured to
    detect a generation time when the second image is generated; and
    acquire a playback delay time from when the second image is generated until the video based on the second image is displayed on the electronic information terminal,
    wherein the transmitter transfers the deletion notification including the generation time of the second image and the playback delay time to the electronic information terminal.

11. A method of processing information, comprising:
    storing, temporarily in a transmission memory, stroke data to be transferred, the stroke data being drawn by a user on a display of an electronic information terminal;
    detecting, by processing circuity of the electronic information terminal, a status of a communication network to which the electronic information terminal is connected, including measuring a communication network delay time;
    transferring the stroke data to an image processing apparatus via the communication network in accordance with the detected status of the communication network; and
    causing a display to display a first image generated by the processing circuitry from the stroke data stored in the transmission memory, when the measured communication network delay time is equal to or longer than a predetermined threshold value.

* * * * *